(12) United States Patent
Alfakhrany et al.

(10) Patent No.: US 9,933,182 B2
(45) Date of Patent: Apr. 3, 2018

(54) SYSTEM FOR OPTIMISING AN ENVIRONMENTAL PARAMETER OF AN ENCLOSED SPACE

(71) Applicant: CSR Building Products Limited, North Ryde, New South Wales (AU)

(72) Inventors: Tarek Alfakhrany, Melrose Park (AU); Colin Schwecke, Westleigh (AU); Derek Munn, Roseville Chase (AU)

(73) Assignee: CSR Building Products Limited, North Ryde, New South Wales (AU)

( * ) Notice: Subject to any disclaimer, the term of this patent is extended or adjusted under 35 U.S.C. 154(b) by 0 days.

(21) Appl. No.: 14/426,815

(22) PCT Filed: Sep. 9, 2013

(86) PCT No.: PCT/AU2013/001021
§ 371 (c)(1),
(2) Date: Mar. 9, 2015

(87) PCT Pub. No.: WO2014/036612
PCT Pub. Date: Mar. 13, 2014

(65) Prior Publication Data
US 2015/0219358 A1 Aug. 6, 2015

(30) Foreign Application Priority Data

Sep. 7, 2012 (AU) .................................. 2012903921
Oct. 19, 2012 (AU) .................................. 2012904591

(51) Int. Cl.
*F24F 11/02* (2006.01)
*E04D 13/17* (2006.01)
(Continued)

(52) U.S. Cl.
CPC .............. *F24F 11/02* (2013.01); *E04D 13/17* (2013.01); *E04F 17/04* (2013.01); *F24F 7/007* (2013.01);
(Continued)

(58) Field of Classification Search
CPC . F24F 11/02; F24F 2007/004; F24F 2007/005
(Continued)

(56) References Cited

U.S. PATENT DOCUMENTS 2,767,639 A * 10/1956 Johnson .................... F24F 7/06
454/264
2,992,402 A * 7/1961 Thomas ................. G01K 7/023
136/230
(Continued)

FOREIGN PATENT DOCUMENTS

DE 102005045991 A1 4/2007
EP 1426702 B1 6/2004
(Continued)

OTHER PUBLICATIONS

Berger, DE 102005045991 A1 English machine translation, Apr. 12, 2007.*
(Continued)

*Primary Examiner* — Alissa Tompkins
*Assistant Examiner* — Phillip E Decker
(74) *Attorney, Agent, or Firm* — Michael Best & Friedrich LLP

(57) ABSTRACT

A system for optimizing one or more environmental parameters of an enclosed space comprising first and second relatively enclosed regions, such as a living space and a roof space within a building, is disclosed. The system comprises an internal sensor, in the first region, and an external sensor, external to the enclosed space, for measuring respective environmental parameters. The system also comprises a
(Continued)

controller and a diverter valve. The controller is configured to specify the first region's ideal internal environmental parameter, and compare this specified parameter with the measured first region's internal parameter and the measured external parameter to determine whether the diverter valve directs air from the first or second enclosed region to exhaust through the ventilator.

21 Claims, 13 Drawing Sheets

(51) Int. Cl.
 E04F 17/04 (2006.01)
 F24F 7/02 (2006.01)
 F24F 11/00 (2018.01)
 F24F 7/007 (2006.01)
 F24F 7/06 (2006.01)
 F24F 13/10 (2006.01)
 F24F 13/14 (2006.01)
 F24F 7/00 (2006.01)
(52) U.S. Cl.
 CPC ............... F24F 7/02 (2013.01); F24F 7/06 (2013.01); F24F 11/0001 (2013.01); F24F 13/10 (2013.01); F24F 7/025 (2013.01); F24F 11/001 (2013.01); F24F 11/0012 (2013.01); F24F 11/0015 (2013.01); F24F 11/0017 (2013.01); F24F 13/14 (2013.01); F24F 2007/001 (2013.01); F24F 2007/002 (2013.01); F24F 2011/0013 (2013.01); F24F 2011/0016 (2013.01); Y02B 30/78 (2013.01)
(58) Field of Classification Search
 USPC .............. 454/367, 369, 357, 358, 364, 362
 See application file for complete search history.

(56) References Cited

U.S. PATENT DOCUMENTS

| | | | | |
|---|---|---|---|---|
| 3,011,004 | A * | 11/1961 | Meador | G01K 7/023 136/231 |
| 4,111,048 | A * | 9/1978 | Zuckerman | F24F 11/02 374/109 |
| 4,205,381 | A * | 5/1980 | Games | F24F 11/00 165/216 |
| 4,349,281 | A * | 9/1982 | Onksen | G01K 1/16 374/136 |
| 4,742,475 | A * | 5/1988 | Kaiser | G05D 23/1905 165/208 |
| 4,795,499 | A * | 1/1989 | Ridenour | G01K 13/02 136/230 |
| 4,916,642 | A * | 4/1990 | Kaiser | G05D 23/1905 165/205 |
| 5,004,149 | A * | 4/1991 | Narikiyo | G05D 23/1934 165/217 |
| 5,014,770 | A * | 5/1991 | Palmer | F24F 5/0046 237/2 B |
| 5,099,654 | A * | 3/1992 | Baruschke | B60H 1/3208 62/180 |
| 5,722,886 | A * | 3/1998 | Steckly | F24F 7/06 454/228 |
| 5,830,339 | A * | 11/1998 | Watanabe | G01N 27/4071 204/425 |
| 6,074,091 | A | 6/2000 | VanDyk et al. | |
| 6,725,914 | B2 * | 4/2004 | Petterson | F24F 3/0444 165/208 |
| 8,230,650 | B1 * | 7/2012 | Stamps | F24F 11/053 52/198 |
| 8,998,691 | B1 * | 4/2015 | Stevenson | F24F 5/0035 454/328 |
| 2001/0002651 | A1 * | 6/2001 | Akatsuka | G01N 27/4077 204/427 |
| 2004/0097184 | A1 * | 5/2004 | Munn | F24F 7/025 454/18 |
| 2006/0144402 | A1 * | 7/2006 | McAuliffe | A61M 16/20 128/205.24 |
| 2007/0197158 | A1 * | 8/2007 | Byczynski | F24F 11/0001 454/339 |
| 2007/0197159 | A1 * | 8/2007 | Byczynski | F24F 11/0001 454/340 |
| 2008/0311842 | A1 * | 12/2008 | Alston | F24F 11/0012 454/361 |
| 2009/0124191 | A1 * | 5/2009 | Van Becelaere | F24F 11/04 454/359 |
| 2009/0255997 | A1 * | 10/2009 | Goldmann | F24F 3/052 236/1 B |
| 2010/0070089 | A1 * | 3/2010 | Harrod | F24F 11/0086 700/277 |
| 2011/0259559 | A1 | 10/2011 | Gheyri | |
| 2011/0263192 | A1 * | 10/2011 | Kouninski | F24F 1/0007 454/239 |
| 2011/0281516 | A1 * | 11/2011 | Newcomer | F24F 3/044 454/231 |
| 2012/0034861 | A1 * | 2/2012 | Skrobek | H05K 7/2059 454/239 |
| 2013/0244563 | A1 * | 9/2013 | Noteboom | F24F 11/0001 454/250 |
| 2013/0260668 | A1 * | 10/2013 | Stakutis | F24F 11/0001 454/256 |
| 2013/0319752 | A1 * | 12/2013 | Cowles | H02G 3/20 174/491 |
| 2015/0219347 | A1 * | 8/2015 | Alfakhrany | F24F 7/025 454/343 |
| 2015/0226442 | A1 * | 8/2015 | Alfakhrany | F24F 13/20 454/18 |

FOREIGN PATENT DOCUMENTS

| | | | | |
|---|---|---|---|---|
| GB | 2483049 | A * | 2/2012 | ............ F24F 7/007 |
| JP | 08-042881 | A | 2/1996 | |
| JP | 2002022234 | A * | 1/2002 | |
| KR | 100631290 | B1 | 9/2006 | |

OTHER PUBLICATIONS

International Search Report for PCT/AU2013/001021 dated Nov. 19, 2013 (5 pages).
International Search Report for AU2012903921 dated Nov. 20, 2012 (9 pages).
International Preliminary Report on Patentability for PCT/AU2013/001021 dated Dec. 24, 2014 (7 pages).

* cited by examiner

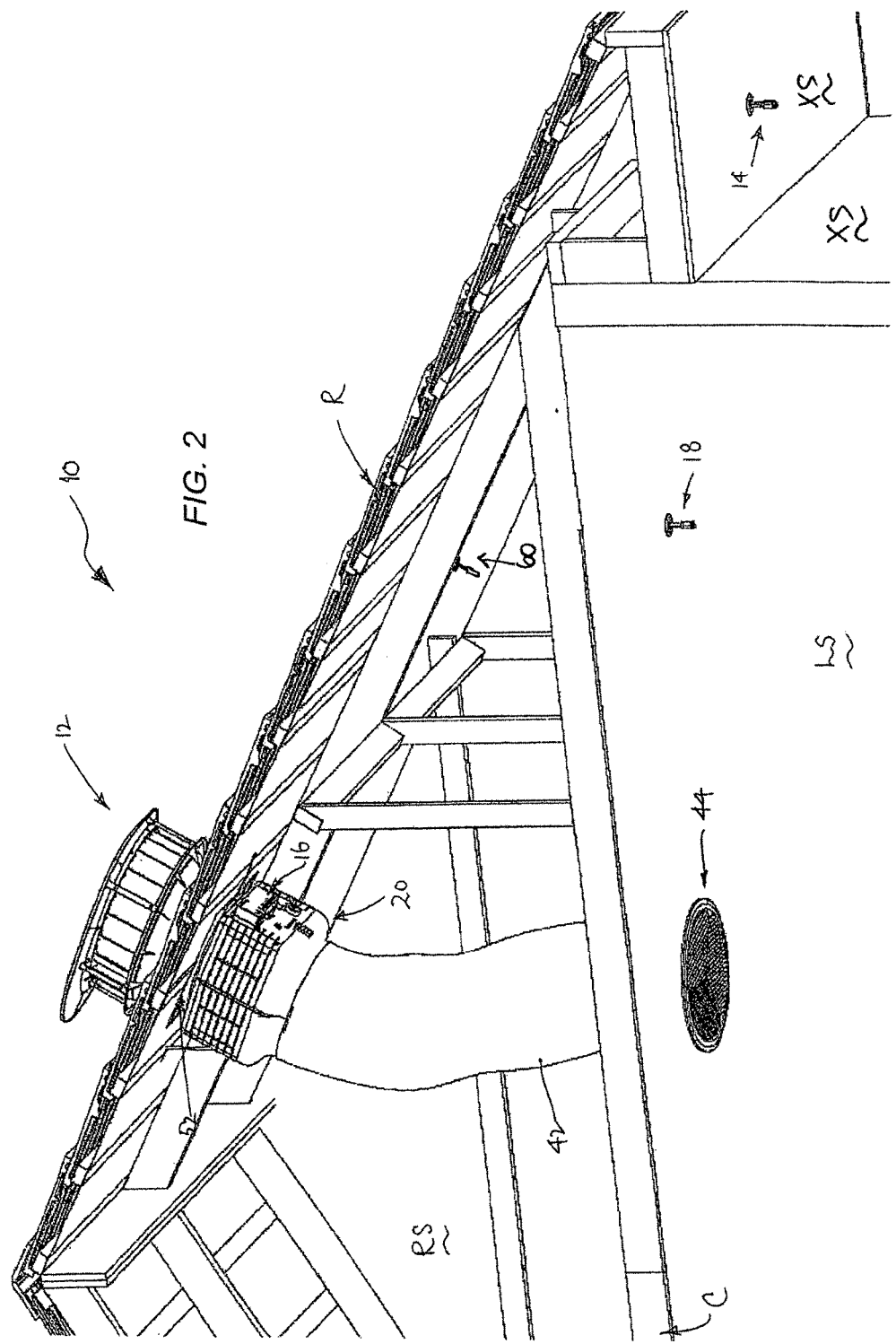

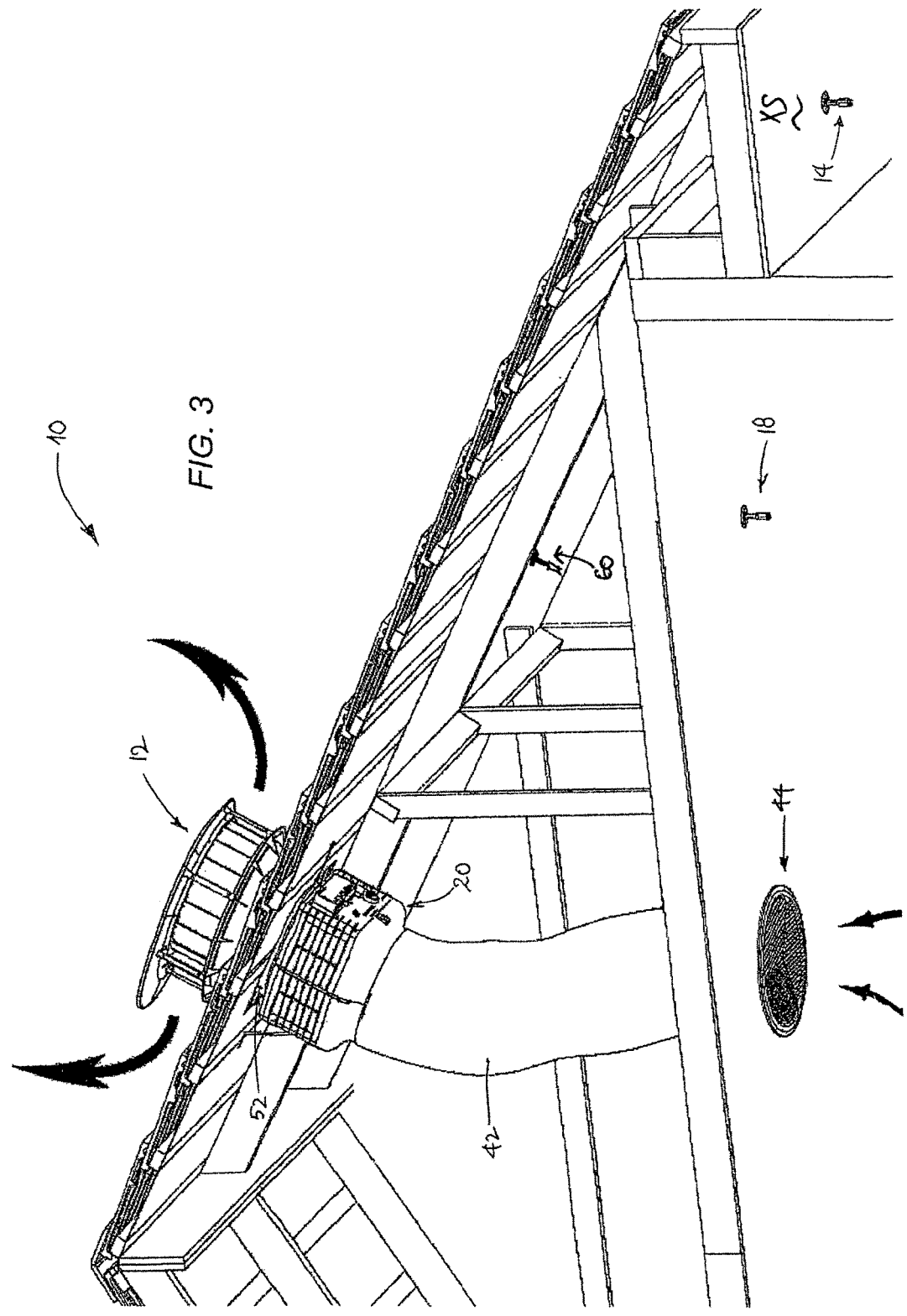

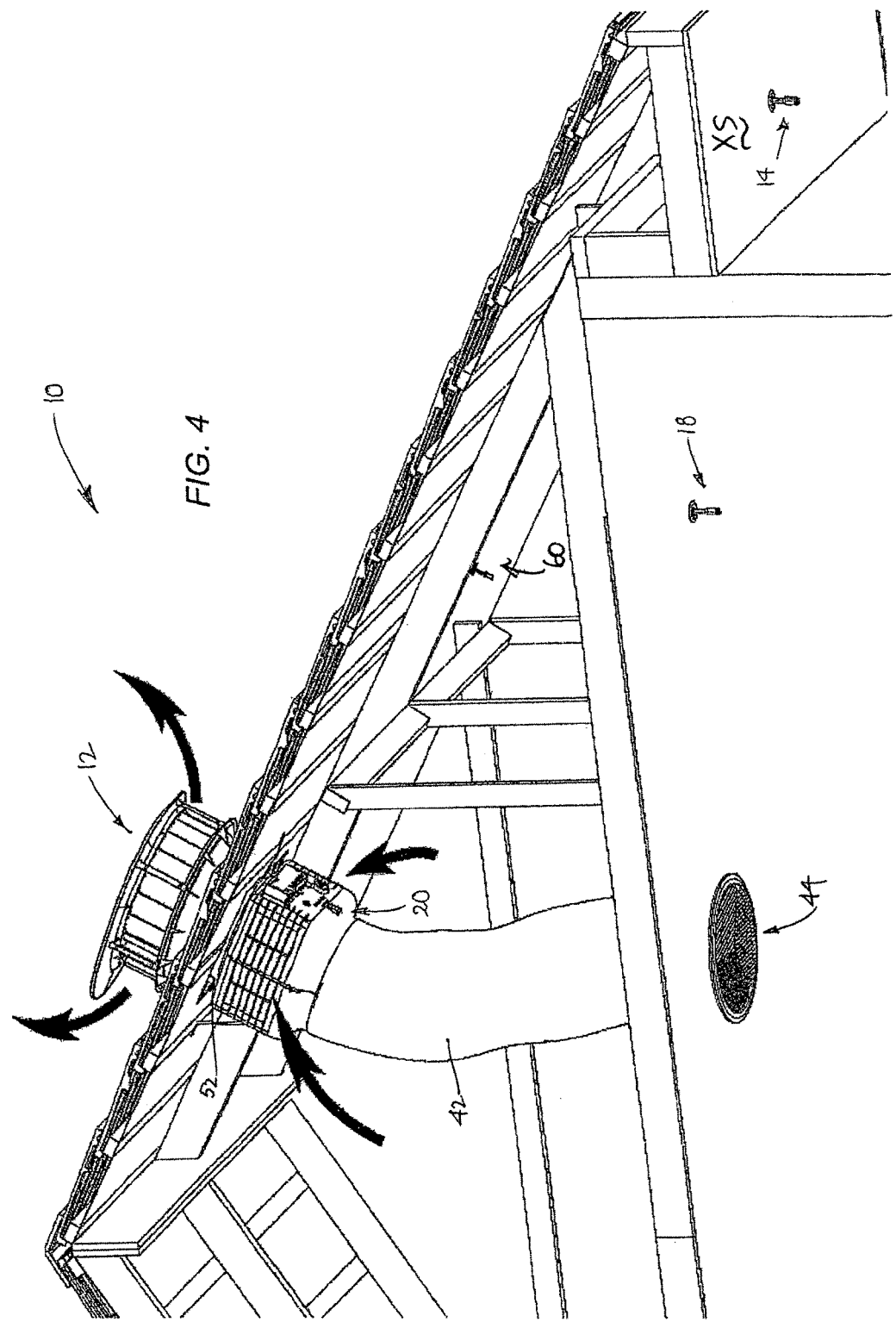

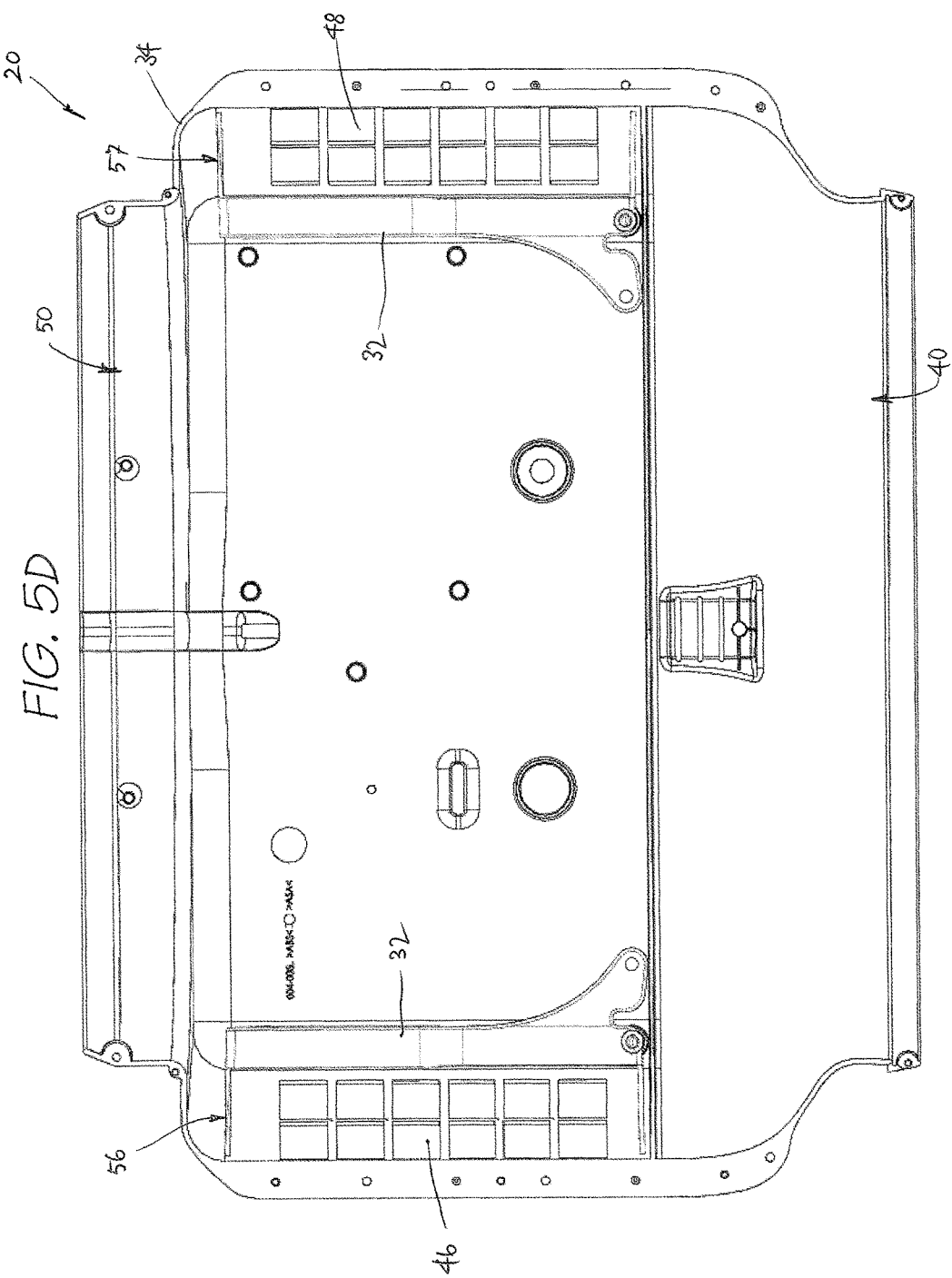

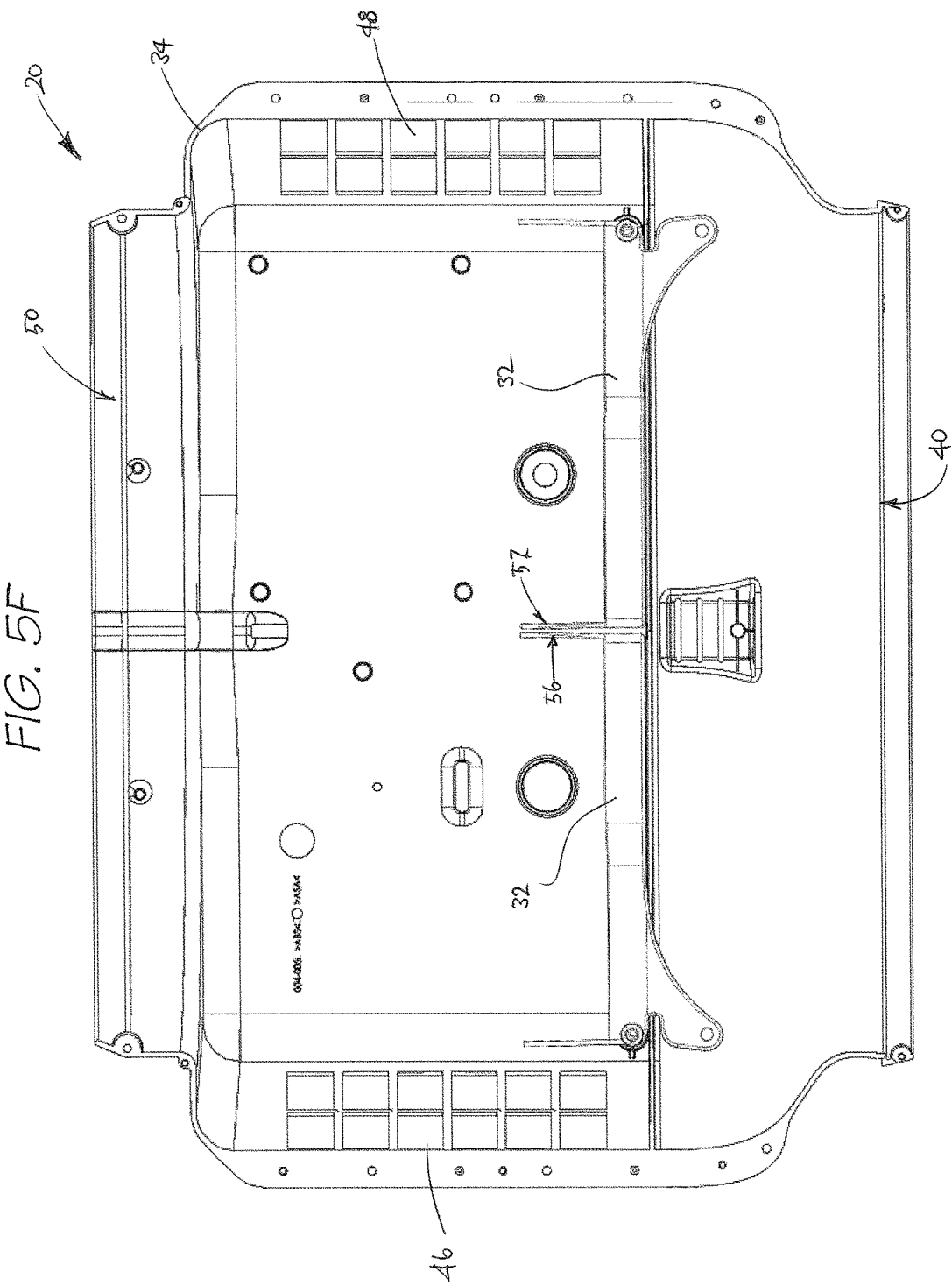

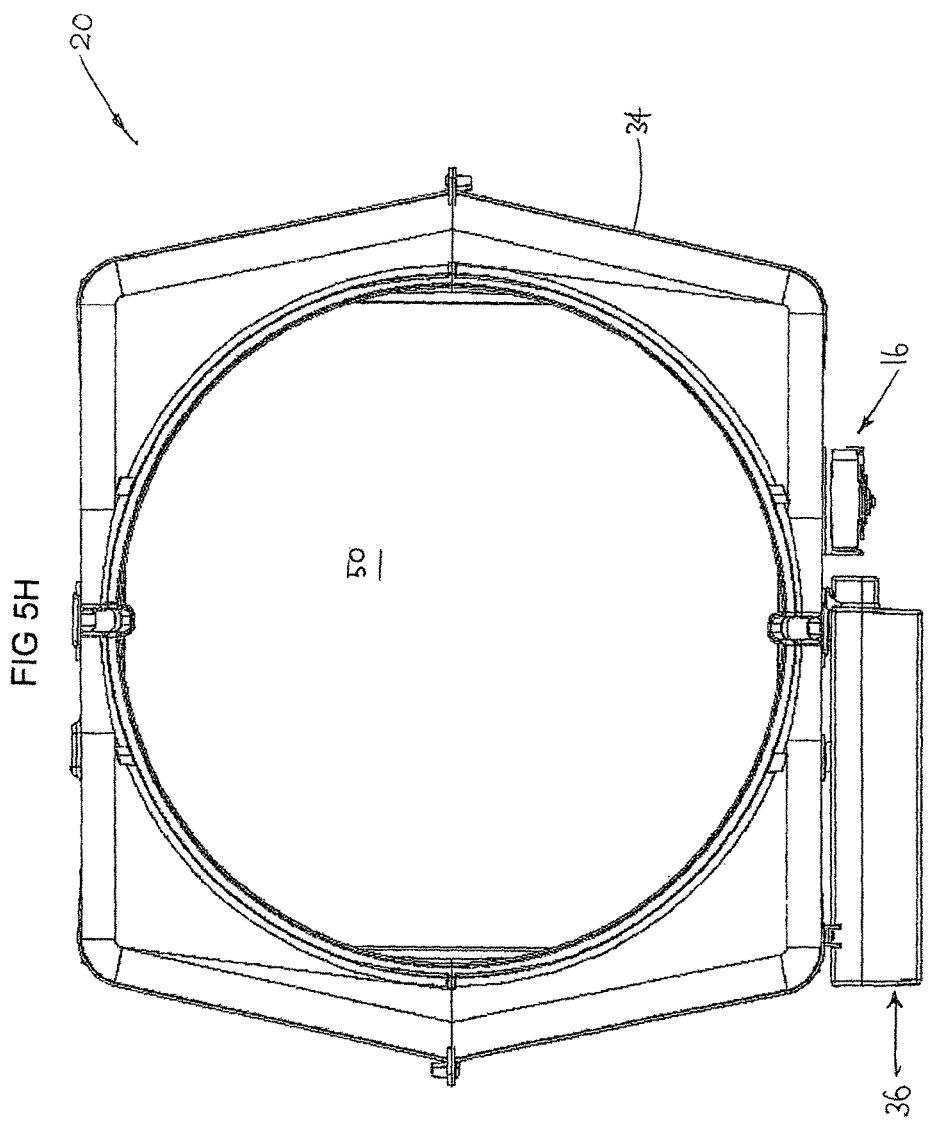

SYSTEM FOR OPTIMISING AN ENVIRONMENTAL PARAMETER OF AN ENCLOSED SPACE

TECHNICAL FIELD

A system is disclosed for optimising one or more environmental parameters of an enclosed space. The enclosed space may for example, comprise a living space within a building. The system can make optimal use of natural and/or power supplemented ventilation of the enclosed space to provide for optimal environmental conditions in the enclosed space.

BACKGROUND ART

The quality of air within an enclosed space is an aspect that is taken into consideration when the space is being designed, especially where humans are to occupy the space. Adequate ventilation is provided to allow the exchange of air between the interior and exterior of the enclosed space, as well as the circulation of air within the space. Factors which may affect circulation of air within an enclosed space include, but are not limited to: temperature; oxygen levels; moisture levels/humidity; smoke; heat; dust; pollens; bacteria; carbon dioxide; pressure; etc.

There are a number of known ventilation solutions for an enclosed space. KR 100631290, for example, discloses a system to exhaust built up pressure within sever and sewage lines in a building by comparing the atmospheric pressure outside the building with the atmospheric pressure within the exhaust/sewer/sewage lines. DE 102005045991, on the other hand, discloses a ventilation system for a basement to ensure moist air is not drawn into the basement, rather that moist an is extracted from the basement. In this regard, a fan is activated to extract air from the basement when the outside humidity is lower than the internal humidity, and the fan is 'turned off' when the external humidity is higher than the internal humidity.

Various heating and cooling systems are also known. US 2011/0259559, for example, discloses a system that heats a room by blowing relatively warmer air from the attic space into the main living space, and cools a room by blowing relatively cooler air from the basement into the main living space. US 2012/0034861, on the other hand, discloses a cooling system for containers that house heat emitting electronic telecommunications devices, which reduces the need to use an air-conditioning unit. A fan is used to extract air from within the container when the temperature inside the container increases above a preset temperature, allowing an exchange of the relatively warmer air with the relatively cooler air. JP 08-042881 discloses a house ventilator whereby a damper and fan are located within a roof space. The damper and fan are connected, and the damper is manually adjustable via strings so that either inside the house, or inside the roof space, or a combination of the two, are ventilated.

The above references to the background art do not constitute an admission that the art forms a part of the common general knowledge of a person of ordinary skill in the art. The above references are also not intended to limit the application of the system as disclosed herein.

SUMMARY

Disclosed herein in a first aspect is a system for optimising one or more environmental parameters of an enclosed space. The enclosed space comprises first and second relatively enclosed regions, such as a living space and a roof space of a building. For example, the first region may define the region for which the one or more environmental parameters are to be specified (e.g. a living space of the enclosed space). The second region may comprise a region different to the first region such as, for example, a region located above a ceiling to the first region (e.g. a roof space located above a ceiling of a living space and under and adjacent to a roof, or an intermediate cavity between floors, etc).

The system comprises a ventilator for externally mounting at an upper region of the enclosed space, such as a roof-mounted ventilator for mounting on a roof. The ventilator may be wind-driven or powered (such as a fan), or may comprise a hybrid of the two. Mounting the ventilator at an upper region of the enclosed space, such as on the roof, enables the system to make use of prevailing atmospheric conditions, and especially of atmospheric wind conditions.

The system also comprises a diverter valve. The diverter valve is configured for selectively receiving therethrough a flow of air from each of the first and second regions (e.g. from both of the living and roof spaces). The diverter valve is further configured for directing the flow of air to the ventilator to be exhausted therefrom (e.g. the diverter valve can enable air from either or both of the living and roof spaces to be exhausted to atmosphere).

The system further comprises an external sensor for measuring one or more of the environmental parameters external to the enclosed space (e.g. ambient conditions, such as temperature, humidity, etc). The measured external environmental parameters may be fed as signals to a controller of the system.

The system further comprises a first internal sensor for measuring one or more of the environmental parameters internal to the first enclosed region (e.g. the conditions of a given region of the enclosed space, such as a living space). The measured internal environmental parameters of the first region may also be fed as signals to a controller of the system.

Additionally, the system comprises a controller. The controller can be configured for enabling one or more of the internal environmental parameters of the first region to be specified (e.g. such as by pre-programming, or by user specification). Again, the specified environmental parameters can form signals fed to the controller.

The controller is also configured to compare the one or more specified internal environmental parameters of the first enclosed region, the one or more measured internal environmental parameters of the first enclosed region and the one or more measured external environmental parameters (e.g. such as by using a control algorithm as applied to the signals fed to the controller).

The controller can determine whether or not the diverter valve directs air from the first or second enclosed regions to be exhausted via the ventilator. The exhaustion (or non-exhaustion) of air can enable the one or more measured internal environmental parameters of the first enclosed region to approach, reach or minimise the deviation from the corresponding one or more specified internal environmental parameters thereof. In addition, each specified internal environmental parameter may be specified as a single value or as a range of values.

For example, the controller can be programmed to ensure that parameters (i.e. conditions) of an internal (e.g. living) space tend towards an optimised level or range. Such parameters may include an optimal temperature or range, an optimal humidity or range, a desirable gas level such as a level above which $CO_2$ or other noxious gases are considered excessive, an airborne mould spore count, etc. By way of a specific example, the controller may be programmed to control the ventilator to achieve a living space temperature of say 21° C., or a living space temperature within the range of say 20-22° C., etc. However, the term "environmental parameters" as employed herein is to be broadly interpreted.

When, for example, the first region is a living space (e.g. located inside a building), the internal sensor and a control panel for the controller may each be located in the living space. Further, by making the control panel accessible (either physically or electronically) to a user of the living space, one or more of the internal environmental parameters (e.g. temperature, humidity, etc) can be specified by the user (e.g. via a keypad, touch screen, dial(s), push-button(s), remote hand-held unit, etc of the control panel, or such parameters may be sent via the interact, smartphone, etc).

In one embodiment the controller may be located in, for example, the roof space, and the control panel, when located in the living space, can communicate (e.g. via a control wire, or wirelessly) with the controller. In another embodiment, a combined controller/control panel may be located in the living space, whereby the controller may then control the ventilator, etc remotely from the living space.

The diverter valve can be controlled by the controller to enable air flowing from the first region (e.g. living space) to selectively be directed to the ventilator. The diverter valve can be controlled by the controller to enable air flowing from the second space (e.g. roof space) to selectively be directed to the ventilator. For example, the controller can be configured to cause (e.g. by a motor) a flap valve to selectively move in a housing of the diverter valve to select between exhausting air from the first and/or second regions (i.e. from either one or from various combinations of the two, e.g. depending on the location of the flap valve).

This is contrary to some known systems, where environmental parameters of a single internal region (such as in KR 100631290 or DE 102005045991) are compared with the corresponding external environmental parameter, to determine whether air within the internal region is exhausted therefrom, or whether external air is supplied thereto. Similarly, US 2012/0034861 discloses only a single internal region in a container, where environmental parameters of the region are compared to preset values by a controller. When the measured internal environmental parameter is outside of the preset value, the controller may provide additional function to the ventilator (e.g. by activating a motor), or may close the inlet and outlets to the container and activate an air-conditioning unit. Despite US 2012/0034861 indicating that an external temperature can also be supplied to the controller, there is no indication as to how this may affect the output of the controller. Thus, any output of the controller is not based on comparisons between the measured external and internal environmental parameters.

Further, whilst JP 08-042881 and US 2011/0259559 disclose enclosed spaces with more than one internal region, neither is concerned with comparing the measured internal parameter of at least one region with the external environmental parameter to determine whether air should be exhausted from the first or second internal region in order for the measured internal parameter to approach, reach or minimise the deviation from the corresponding specified internal environmental parameter. JP 08-042881, for example, discloses a simple diverter valve, with no indication that determination of which space to be ventilated is based on a specific environmental parameter compared between a specified internal parameter, a measured internal parameter and a measured external parameter. The disclosure of US 2011/0259559, on the other hand, is premised on simple heating and cooling theory. That is, as hot air rises, the air in an attic will generally be warmer than the air in a living space, and the living space air will generally be warmer than the air in a sub-floor space. Thus, when the living space is warmer than a preset temperature, air from the sub-floor space is blown into the living space, and vice versa. However, there is no comparison of the temperatures in the various spaces, nor is there comparison of the temperatures with the external temperature.

In one embodiment the controller may be further configured to determine when a differential exists between the specified internal first region, measured internal first region and/or measured external environmental parameters. For example, the controller may be programmed (or be programmable) with a control algorithm which is configured to respond to one or more such differentials. When, for example, a given differential is determined, the controller may be configured to determine whether or not air is to be exhausted from the enclosed space via the ventilator, so that the specified internal environmental parameter(s) tend towards (e.g. are restored to) a desirable level or range. The system may also comprise internal sensors for each of these parameters.

In one embodiment the controller may be configured to e.g. activate the ventilator (e.g. switch it on and, optionally, control its speed). Alternatively or additionally, the controller may be configured to e.g. activate a valve to selectively direct air flow to the roof-mounted ventilator (e.g. when it is being wind-driven). For example, if the roof-mounted ventilator is solely wind-powered, it may be sufficient for the controller simply to operate the valve to direct air from within the enclosed space to the wind-powered ventilator.

The controller may also be configured to e.g. enable air to be drawn into the enclosed space, such as via other entry points to the enclosed space (e.g. windows, vents, doors, etc). For example, whilst the ventilator is exhausting air, vents and other inlets can allow and/or may be opened whereby air is simultaneously drawn into the enclosed space from beyond the enclosed space (i.e. from the atmosphere). Such air entry may occur naturally and/or may be actively controlled.

In one embodiment the external sensor may be mounted to an external surface of the enclosed space. The external sensor may be further configured to be sufficiently spaced from the external surface such that influence on the measured external environmental parameter by the external surface, to which the external sensor is mounted, is minimised. In this regard, isolation of the external sensor from the surface to which it is mounted can provide a more accurate indication of the parameter being measured (i.e., the external sensor is relatively unaffected by the radiation and conduction of the surface to which it is mounted).

For example, when temperature is being measured, the surface to which to external sensor is mounted may conduct and radiate heat. If the external sensor were to be mounted directly, or near, to the surface, an erroneous temperature may be measured by the sensor, especially on warm and hot days or if the surface is in direct sun. In such an example, the external surface of the enclosed space will be hotter than the actual air temperature. Further, a boundary layer of air will form at or near the external surface, with the temperature of the boundary layer being influenced by the external surface and thus not being indicative of the true ambient air temperature. If the external sensor were not thermally isolated from the surface, the measured temperature would be higher than the actual air temperature and may incorrectly influence the way in which the controller operates the system.

When such a system is being utilised in a house, for example, such an external sensor may be positioned under the eaves of the house. In such an example, it is preferable to minimise the extent to which the sensor extends from the eaves, to ensure that a person walking thereunder does not impact, and potentially damage, the sensor. It is also preferable to keep the sensor as close to the surface as possible, without having the surface affect the measurement capabilities and accuracy of the sensor. This is also to minimise the cost of production (i.e. to use less material) and to ensure the sensor remains unobtrusive and does not affect the aesthetics of the enclosed space, such as a building, to which it is mounted.

In an embodiment the system may further comprise a second internal sensor for measuring one or more environmental parameters of the second region (e.g. for sensing parameter(s) of a roof space inside a building). The second region internal sensor and the controller may be configured such that the measured parameter(s) of the second region can be fed as signals to the controller. In addition, when determining the differentials, the controller can take into account differentials determined with respect to the measured second region environmental parameter(s).

In an embodiment the enclosed space may further comprise a third enclosed region, such as a space located under the first enclosed region. When, for example, the enclosed space is defined by a building, the third enclosed region may comprise a sub-floor space of the building. Again, an internal sensor for the third region may be configured for feeding measured parameter(s) of the third region as signals to the controller.

In this embodiment the system may further comprise a ventilator for the sub-floor space. For example, the ventilator may also be controllable by the controller.

In an embodiment, when the ventilator is powered (e.g. it is a fan or hybrid), the controller may be configured to control the speed of the ventilator. This control of the ventilator may be in conjunction with (i.e. it may take into account) any additional wind powering of the ventilator. In this regard, the controller may be configured to adjust the power supplied to the ventilator to maintain a desired (e.g. predetermined) running speed thereof, and power maybe varied with increasing or decreasing wind speed. Such control can provide significant electrical energy savings in the ventilation of a building.

Similarly, when the sub-floor ventilator is powered, the controller may be configured to control the speed of the sub-floor ventilator.

Thus, the system can provide for a variety of control sequences and outputs in the optimisation of parameter(s) within the enclosed space.

In an embodiment the controller may be configured to respond to (e.g. by being programmable to or by) a control algorithm. The control algorithm may take the form of software and/or hardware configured on a controller in the form of a computer or microprocessor.

In an embodiment the system may further comprise an additional (e.g. wind-driven, powered or a hybrid) ventilator. The additional ventilator may also be controllable by the controller to exhaust air from the enclosed space. When, for example, the additional ventilator is powered, the controller may also be configured to control the speed of the additional ventilator (e.g. to take into account wind power, such as with a hybrid).

In an embodiment the system may be configured such that the additional ventilator has a different format to the first ventilator. For example, the first ventilator may comprise a hybrid ventilator and the additional ventilator may comprise a powered fan or a solely wind-driven ventilator. The controller may be configured to work with, respond to and control these different formats.

In one embodiment the controller, internal sensor(s), and mechanism for specifying the internal parameters (e.g. keypad, touch screen, dials, buttons, etc), may together form part of a single unit to be located in the enclosed (e.g. first, living) space. Such a control unit may then simply require wire or wireless connection to each of the ventilator, diverter valve, external sensor(s), and various internal sensors and ventilators.

Power for the controller, and various sensors, valves and ventilators (i.e. roof-mounted, additional, subfloor, etc), may comprise mains power, battery power, or power from renewable sources (e.g. generated at the building), such as solar, wind, micro-hydro, co- or tri-generated, etc.

Disclosed herein, in a second aspect, is a system for optimising one or more environmental parameters of an enclosed space. The enclosed space can comprise first and second respectively enclosed spaces, with the second space being located above a ceiling to the first space.

The system also comprises a roof-mounted ventilator for mounting on a roof of the second space. The roof-mounted ventilator may be wind-driven or powered (such as a fan), or may comprise a hybrid of the two. Mounting the ventilator on the roof enables the system to make use of prevailing atmospheric conditions, and especially of atmospheric wind conditions.

The system also comprises a diverter valve for location in the second enclosed space, and for selectively receiving therethrough a flow of air from each of the first and second spaces. The diverter valve can direct the flow of air from either the first or second space to the roof-mounted ventilator to be exhausted therefrom.

The system also comprises an external sensor for measuring one or more of the environmental parameters external to the enclosed spaces (e.g. ambient conditions such as temperature, humidity, etc). The measured external environmental parameters may be fed as signals to a controller of the system.

The system further comprises a first internal sensor for measuring one or more of the environmental parameters internal to the first space (e.g. the conditions of the first space, such as the living space). The measured first space environmental parameters may be fed as signals to a controller of the system.

Additionally, the system comprises a controller. The controller can be configured for enabling one or more of the first space environmental parameters to be specified (e.g. such as by pre-programming or by user specification). Again, the specified first space environmental parameters can form signals fed to the controller.

The controller is configured to compare the specified first space, measured first space and measured external environmental parameters. The controller can also determine whether or not air is to be exhausted from the first or the second space via the roof-mounted ventilator, to enable the one or more measured first space environmental parameters to approach or reach the corresponding one or more specified first space environmental parameters.

In an embodiment, the controller can determine if the measured first space environmental parameter equals the specified first space environmental parameter. If it does, the controller can selectively adjust the diverter valve such that air-flow is diverted from the second space to the roof-mounted ventilator to be exhausted therefrom.

In an embodiment, the controller can also determine if the measured first space environmental parameter is greater than the specified first space environmental parameter. If it is, and the measured external environmental parameter is less than the measured first space environmental parameter, the controller can selectively adjust the diverter valve such that air-flow is diverted from the first space to the roof-mounted ventilator to be exhausted therefrom.

In an embodiment, the controller can also determine if the measured first space environmental parameter is greater than the specified first space environmental parameter. If it is, and the measured external environmental parameter is greater than the measured first space environmental parameter, the controller can selectively adjust the diverter valve such that air-flow is diverted from the second space to the roof-mounted ventilator to be exhausted therefrom.

In an embodiment, the controller can also determine if the measured first space environmental parameter is less than the specified first space environmental parameter. If it is, the controller can selectively adjust the diverter valve such that air-flow is diverted from the second space to the roof-mounted ventilator to be exhausted therefrom.

In an embodiment of the system, when the measured first space environmental parameter is less than the specified first space environmental parameter, the controller can be further configured to determine whether the measured external environmental parameter is greater or less than the measured first space environmental parameter. If the measured external environmental parameter is greater than the measured first space environmental parameter, the controller can selectively adjust the diverter valve such that air-flow is diverted from the first space to the roof-mounted ventilator to be exhausted therefrom. Alternatively, if the measured external environmental parameter is less than the measured first space environmental parameter, the controller can selectively adjust the diverter valve such that air-flow is diverted from the second space to the roof-mounted ventilator to be exhausted therefrom.

When the system comprises a roof-mounted ventilator is of the type that can be wind-driven and/or powered, and when the controller determines that air-flow is diverted from the first space to the roof-mounted ventilator to be exhausted therefrom, the controller can power the ventilator. In this regard, the controller can activate or deactivate power being supplied to the ventilator, thus enabling it to be power-driven or turned off. When turned off, and the ventilator is of the hybrid type that can also be driven by wind, the ventilator may still be able to function dependent on prevailing wind conditions. Whilst a hybrid ventilator may generally be power- or wind-drive, it should be appreciated that a rotor of the ventilator may be rotated by other means, such as by thermally generated gas currents exiting the enclosed space via the ventilator, or as a result of other gas pressurising means operating within the enclosed space (eg. conditioned or heat-induced airflow).

In an embodiment, the system may further comprise a second internal sensor for measuring one or more of the environmental parameters internal to the second space. In this embodiment, the controller may also be configured to enable the second space environmental parameters to be specified. The controller may be further configured to determine that, when the air-flow is being diverted from the second space to the roof-mounted ventilator and the measured second space environmental parameter exceeds the specified second space environmental parameter, the controller powers the ventilator. Such a configuration does not prevent the first space environmental parameters being optimised, but rather assists in maintaining the optimisation of the first space environmental parameters. For example, when the air temperature inside a living space of a house is hotter than the specified temperature (e.g. 21-22° C.), and the outside air temperature is hotter than the air temperature inside a living space of a house, the roof space of the house will generally be hotter than the outside temperature. Whilst the natural ventilation capabilities of the roof-mounted ventilator can assist in reducing the roof-space temperature, when extreme temperatures are reached (such as above 45° C.), powering the ventilator may achieve additional reductions in temperature, by increased air flow, in the roof space. This can cool the roof space, and minimise the effect of the roof space temperature on the remainder of the house (i.e. excessive heat is not retained in the roof space to be later radiated throughout the house).

The system of the second aspect may be otherwise as defined above in the first aspect.

Also disclosed herein, in a third aspect, is a system for optimising one or more environmental parameters of an enclosed space. The enclosed space comprises first and second respectively enclosed spaces, such as a living space and a roof space within a building.

The system comprises a roof-mounted ventilator for mounting on a roof of the enclosed space. The roof-mounted ventilator may be wind-driven or powered (such as a fan), or may comprise a hybrid of the two. Mounting the ventilator on the roof enables the system to make use of prevailing atmospheric conditions, and especially of atmospheric wind conditions.

The system also comprises an external sensor for measuring one or more of the environmental parameters external to the enclosed space (e.g. ambient conditions, such as temperature, humidity, etc). The measured external environmental parameters may be fed as signals to a controller of the system.

The system further comprises an internal sensor for measuring one or more of the environmental parameters internal to the first space (e.g. the conditions of a given space of the enclosed space, such as a living space) and an internal sensor for measuring one or more of the environmental parameters internal to the second space (e.g. the conditions of a roof space). The measured internal environmental parameters may also be fed as signals to a controller of the system.

Additionally, the system comprises a controller. The controller can be configured for enabling one or more of the internal environmental parameters of the first or second space to be specified (e.g. such as by pre-programming, or by user specification). Again, the specified environmental parameters can form signals fed to the controller.

The controller is also configured to compare the specified, measured internal and measured external environmental parameters (e.g. such as by using a control algorithm as applied to the signals fed to the controller).

The controller can determine whether or not air is to be exhausted from the enclosed space via the roof-mounted ventilator. The exhaustion (or non-exhaustion) of air can enable the one or more measured internal environmental parameters to approach or reach the corresponding one or more specified internal environmental parameters. In addition, each specified internal environmental parameter may be specified as a single value or as a range of values.

For example, the controller can be programmed to ensure that parameters (i.e. conditions) of an internal (e.g. living) space tend towards an optimised level or range. Such parameters may include an optimal temperature or range, an optimal humidity or range, a desirable gas level such as a level above which $CO_2$ or other noxious gases are considered excessive, an airborne mould spore count, etc. By way of a specific example, the controller may be programmed to control the roof-mounted ventilator to achieve a living space temperature of say 21° C., or a living space temperature within the range of say 20-22° C., etc. However, the term "environmental parameters" as employed herein is to be broadly interpreted.

In one embodiment the controller may be further configured to determine when a differential exists between the specified internal, measured internal and/or measured external environmental parameters. For example, the controller may be programmed (or be programmable) with a control algorithm which is configured to respond to one or more such differentials. When, for example, a given differential is determined, the controller may be configured to determine whether or not air is to be exhausted from the enclosed space via the roof-mounted ventilator, so that the specified internal environmental parameter(s) tend towards (e.g. are restored to) a desirable level or range. The system may also comprise internal sensors for each of these parameters.

In one embodiment the controller may be configured to e.g. activate the roof-mounted ventilator (e.g. switch it on and optionally control its speed). Alternatively or additionally, the controller may be configured to e.g. activate a valve to selectively direct air flow to the roof-mounted ventilator (e.g. when it is being wind-driven). For example, if the roof-mounted ventilator is solely wind-powered, it may be sufficient for the controller simply to operate the valve to direct air from within the enclosed space to the wind-powered ventilator.

The system of the third aspect, may be otherwise as defined above in the first or second aspects.

Disclosed herein, in a fourth aspect, is a system for optimising one or more environmental parameters of an enclosed space, such as a living space within a building.

The system comprises a ventilator for mounting externally to the enclosed space. The ventilator may be wind-driven or powered (such as a fan), or may comprise a hybrid of the two.

The system also comprises an external sensing device for measuring one or more of the environmental parameters external to the enclosed space (e.g. ambient conditions, such as temperature, humidity, etc). The measured external environmental parameters may be fed as signals to a controller of the system.

The system further comprises an internal sensor for measuring one or more of the environmental parameters internal to the enclosed space (e.g. the conditions of a Oven space of the enclosed space, such as a living space). The measured internal environmental parameters may also be fed as signals to a controller of the system.

Additionally, the system comprises a controller. The controller can be configured for enabling one or more of the internal environmental parameters to be specified (e.g. by pre-programming, or by user specification). Again, the specified environmental parameters can form signals fed to the controller.

The controller is also configured to compare the specified, measured internal and measured external environmental parameters (e.g. such as by using a control algorithm as applied to the signals fed to the controller).

The controller can determine whether or not air is to be exhausted from the enclosed space via the ventilator. The exhaustion (or non-exhaustion) of air can enable the one or more measured internal environmental parameters to approach or reach the corresponding one or more specified internal environmental parameters. In addition, each specified internal environmental parameter may be specified as a single value or as a range of values.

For example, the controller can be programmed to ensure that parameters (i.e. conditions) of an internal (e.g. living) space tend towards an optimised level or range. Such parameters may include an optimal temperature or range, an optimal humidity or range, a desirable gas level such as a level above which $CO_2$ or other noxious gases are considered excessive, an airborne mould spore count, etc. By way of a specific example, the controller may be programmed to control the ventilator to achieve a living space temperature of say 21° C., or a living space temperature within the range of say 20-22° C., etc. However, the term "environmental parameters" as employed herein is to be broadly interpreted.

In accordance with the present disclosure, the external sensing device comprises a surface mounting portion, a remote end portion and a body portion that extends therebetween. A sensor for measuring environmental parameters is located in the remote end portion.

The device is also substantially hollow, and the extending body portion and remote end portion are partitioned into a plurality of compartments. When the device is mounted to an external surface of the enclosed space, the remote end portion is sufficiently spaced from the external surface to minimise influence on the measured external environmental parameter by the external surface.

The system of the fourth aspect and, more specifically, the external sensing device of the fourth aspect, may be otherwise as defined above in the first, second or third aspects.

Also disclosed herein, in a fifth aspect, is a sensing device for mounting to a surface. The device comprises a sensor for measuring environmental parameters, a surface mounting portion, and a body portion extending between the mounting portion and a remote end portion. The sensor is located in the remote end portion of the device. The environmental parameter which the sensor can measure may include ambient conditions, such as temperature, humidity, etc. The device is substantially hollow, and the extending body portion and remote end portion are partitioned into a plurality of compartments. This can, again, when the sensor is used to measure air temperature, for example, reduce the amount of conductive and convective heat transmitted to the sensor internally from the mounting surface, providing a more accurate measurement of the ambient air temperature.

Spacing the sensor from the surface to which it is mounted can assist in minimising the influence of the surface on the parameter the sensor is measuring. This can provide a more accurate measurement of the parameter. When temperature is being measured by the sensor, for example, the surface to which to surface mounting portion is mounted may conduct and radiate heat. If the sensor were to be mounted directly (or near) to the surface, an erroneous temperature may be measured by the sensor, especially on warm and hot days or if the surface is in direct sun. In such an example, the surface to which the sensing device is mounted will generally be hotter than the actual air temperature. If the sensor were not isolated from the surface, the measured temperature would be higher than the actual air temperature.

The sensing device may include more than one sensor, enabling a single device to measure more than one environmental parameter.

In an embodiment, the extending body portion may be narrower than the surface mounting portion and/or the remote end portion. When the sensor is used to measure air temperature, this can reduce conduction heat transfer from the surface to the sensor and also reduce boundary layer build up, whilst providing a sufficient surface area at the remote end portion to adequately transmit heat to the sensor. A boundary layer of air forms at the surface, which will generally be influenced by the surface itself. Narrowing of the body portion reduces the boundary layer building up around the sensor, allowing the remote end (i.e. the sensor) to protrude substantially through the boundary layer and be relatively unaffected thereby. This allows the actual air temperature to be measured and be relatively unaffected by the boundary layer.

In an embodiment, the device may further comprise a shroud positioned between the surface mounting portion and the extending body portion. The shroud may cover a portion of the surface when the device is mounted thereto. When the sensor is used to measure air temperature or humidity, this can assist in shielding the sensor from heat being radiated from the surface, or prevent condensation from dripping onto the sensor.

The sensing device disclosed in the fifth aspect may be utilised in the system disclosed above in any of the first to fourth aspects.

BRIEF DESCRIPTION OF THE DRAWINGS

Notwithstanding any other forms that may fall within the scope of the system and device as set forth in the Summary, specific embodiments of the system and device will now be described, by way of example only, with reference to the accompanying drawings in which:

FIG. 2 shows a detail of the diagram of FIG. 1 illustrating some of the components of the system;

FIG. 3 shows the detail of FIG. 2 to illustrate air flow exhausting from a living space of the enclosed space;

FIG. 4 shows the detail of FIG. 2 to illustrate air flow exhausting from a roof space of the enclosed space;

FIGS. 5A to 5H show various views of a diverter valve that forms a component of the system of FIGS. 1 to 4.

DETAILED DESCRIPTION OF SPECIFIC EMBODIMENTS

Figure 1:
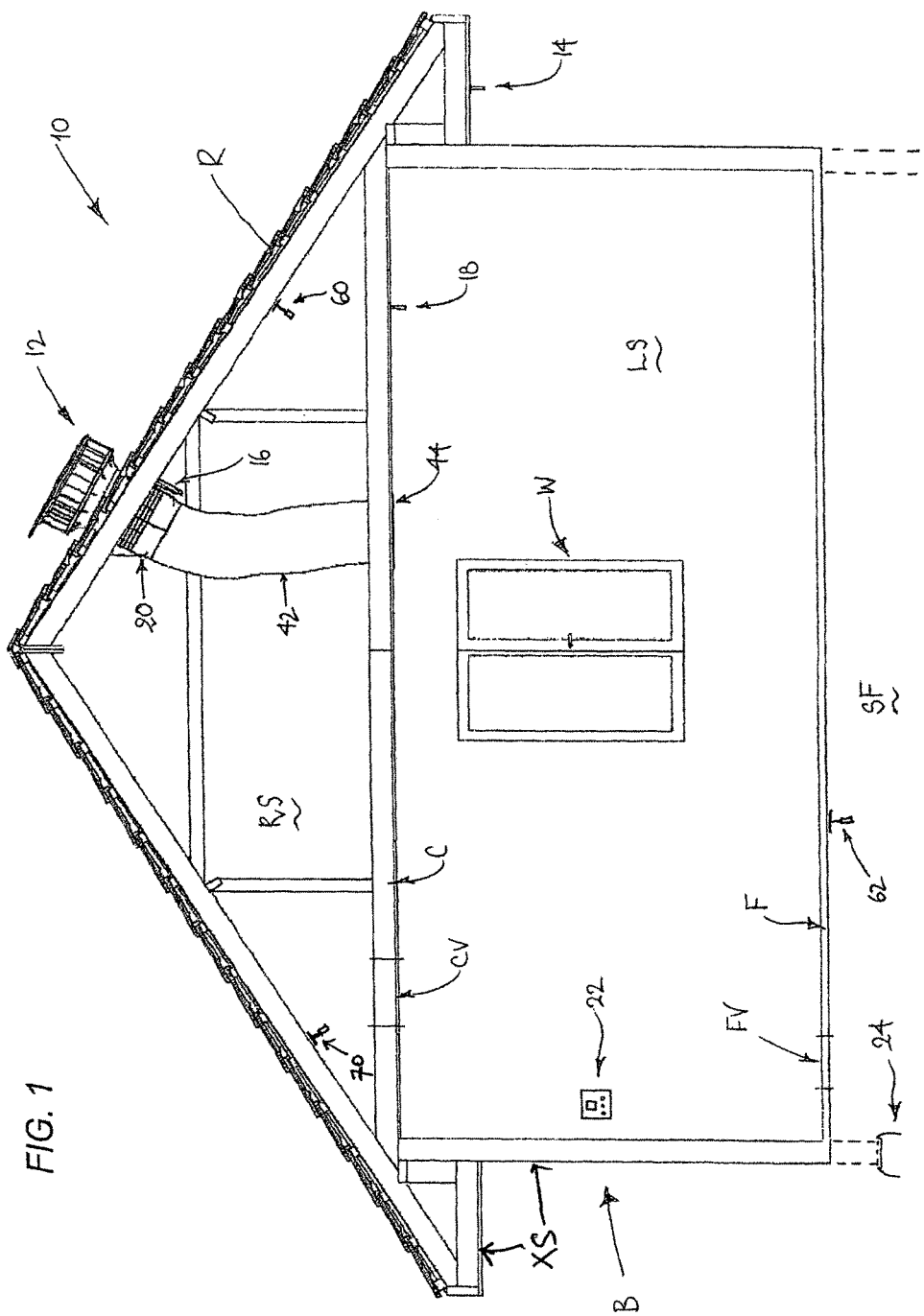
FIG. 1 shows a schematic diagram of one embodiment of a system for optimising environmental parameter(s) of an enclosed space.

FIGS. 1 to 4 schematically depict a system 10 for optimising one or more environmental parameters of an enclosed space. As shown in FIG. 1, such an enclosed space may comprise a living space LS located within a building B, which living space may comprise one or more spaces or rooms occupied by human and/or animal users of the building B. Optionally, the building B can comprise a roof space RS (i.e. located between a ceiling C and a floor F of the living space LS). As a further option, the building B can comprise a subfloor space SF (i.e. located under the floor F of the living space LS).

The system 10 may find particular, though certainly not exclusive, application with domestic dwellings, but can be adapted to commercial and industrial facilities for human and/or animal users.

In FIGS. 1 to 4, the system 10 comprises a roof-mounted ventilator 12 that is mounted on a roof R of the building B (e.g. a sloping tiled or clad roof that overlies and helps define the roof space RS). Whilst the roof-mounted ventilator may be wind-driven or may comprise a powered fan, the ventilator 12 as depicted comprises a hybrid of the two. In this regard, the ventilator 12 may embody the principles of the hybrid ventilator as disclosed in WO 2006032111.

Use of a roof-mounted ventilator 12 allows the system 10 to make maximum use of ambient conditions, whereby the control system can respond accordingly. This is to be contrasted with prior art systems which, usually because of prevailing weather (e.g. winter and/or snow-bound) conditions, must employ ventilators that are located internally within e.g. a roof space.

The system 10 further comprises an external sensor 14. The external sensor 14 is selected, configured and able to measure one or more environmental parameters external to the building B, as described in greater detail below with reference to FIG. 6. These parameter(s) can include ambient conditions, such as temperature, humidity, and so forth. The external sensor may comprise an integrated (or hybrid) sensor that is capable of sensing each environmental parameter, or may comprise a bundle of individual sensors. Alternatively, each separate sensor may be discretely located on the building. The measured external environmental parameter(s) are fed as signals to a controller 16 of the system 10, as described in greater detail below.

The system 10 further comprises an internal sensor 18. The internal sensor 18 is also selected, configured and able to measure one or more environmental parameters internal to the building B (i.e. parameters of the enclosed space(s)). These parameter(s) can be representative of the living conditions of e.g. living space(s) LS of the enclosed space, such as temperature and humidity. Again, the internal sensor may comprise an integrated (or hybrid) sensor that is capable of sensing each environmental parameter, or may comprise a bundle of individual sensors, or may comprise separate discrete sensors. The measured internal environmental parameter(s) are also fed as signals to the controller 16.

In the system 10 the controller 16 is configured to receive as inputs signals from at least the external sensor, the internal sensor, as well as a user-related signal (e.g. a user-specified and/or system-specified input representing a desired/desirable user specification). Each specified internal environmental parameter may be specified as a single value, or may be specified to be within a range of values. In addition, in response to one or more control algorithms/sequences, the controller 16 is configured to control the ventilator 12, as well as diverter valve 20 (to be described in greater detail below). The control algorithm can take the form of software and/or hardware configured on a controller in the form of a computer or microprocessor. The controller may also be additionally accessed and/or controlled wirelessly and/or via the internet.

In the system 10 as depicted, the controller 16 is shown located in a roof space RS of the building. In the particular embodiment shown, the controller 16 is conveniently located on (e.g. mounted externally to) the diverter valve 20. This is an optimised location, in that the controller is thereby free from interference by a domestic user, but is also located in proximity of the ventilator 12, as well as in proximity of the diverter valve 20. Whilst the roof space RS shown is located above and adjacent to ceiling C, and under and adjacent to the roof R, it should be understood that the roof space may comprise an intermediate cavity defined between floors, etc.

In the system 10 as depicted, the controller 16 is configured to receive input from a control panel 22 located in the living space LS. The control panel 22 as shown is physically accessible by a user of the living space LS, but may be electronically accessed by a user remotely from the living space (e.g. via a remote controller, via the internet, via a smartphone and an associated application, etc). The control panel 22 allows for internal environmental parameter(s) (e.g. temperature, humidity, $CO_2$ levels, etc) to be user-specified. In this regard, the control panel 22 comprises a keypad, although may additionally or alternatively comprise one or more of a touch screen, dial(s), push-button(s), a remote hand-held unit, etc. The control panel 22 and/or controller 16 may also be "smart" in that one or more of the internal environmental parameters may be pre-programmed or calculated by the controller to provide for optimum user comfort (e.g. an automatically programmed functionality, optionally controlled remotely via a web-based program).

The user specified (or pre-programmed/calculated) environmental parameters can be sent as signals from the control panel 22 to the controller 16. When the controller 16 is located in the roof space, the control panel 22 can communicate with the controller 16 via a control wire or wirelessly. However, a combined controller/control panel may instead be located in the living space LS, which communicates with various system components via the control wires or wirelessly.

Further, the control panel 22 and controller 16 may each be configured such that internal environmental parameter(s) can be specified for a number of spaces (e.g. rooms, regions, etc) of the living space LS. Each such room/region may also comprise its own internal sensor and a respective control panel/controller therefore.

Having specified the internal environmental parameter(s), the controller 16 is configured to then compare the specified parameter(s) against the measured internal and external environmental parameter(s). Typically the controller 16 does this using a control algorithm which receives as its inputs the signals fed from the external and internal sensors, and the user- or system-specifications. For example, when a differential exists between the specified internal, measured internal and/or measured external environmental parameters the control algorithm determines where, and whether or not, air is to be exhausted from the enclosed space via the roof-mounted ventilator, etc, so that the user- or system-specified living space parameter(s) can tend towards (e.g. are restored to, or maintained at) a desirable level or range.

The controller 16 can switch on and off the roof-mounted ventilator 12. The controller can also control the speed of ventilator 12, and other ventilators (as described below). When the roof-mounted ventilator 12 is solely wind-powered, the controller can simply operate the diverter valve 20 to direct air from a given space within the building (e.g. LS or RS) to the wind-powered ventilator.

Further, the controller 16 may also determine that air needs to be simultaneously or individually exhausted from various spaces in the building, including the roof and sub-floor spaces. In this regard, the controller 16 can be configured to operate one or more ventilators, fans, diverter valves, etc, such as an optional subfloor ventilator 24.

Thus, the controller 16 can cause a number of air streams to be exhausted from the building B, including via ventilator 12. Whether air is exhausted or not, the control sequence adopted is typically such that the internal environmental parameter(s) approach, reach or are maintained at the corresponding user- or system-specified parameter(s).

By way of example, the controller 16 can be programmed to ensure that the temperature and humidity of the living space LS each tends towards a user- or system-determined level or range. To achieve this, the controller may choose to exhaust air from one or more rooms/spaces of the living space, and/or from the roof space, and/or from the sub-floor space.

In a further variation, the controller may also be configured to control air intake into the building via vents, windows W, doors, etc, or even by purpose-located intake fan or ventilator. Whilst usually the vents allow for air intake from the atmosphere, floor-located vents FV may be provided to allow for airflow and communication between the living space LS and the subfloor space SF. A ceiling-located vent CV may also be provided to allow for airflow and communication between the living space LS and the roof space RS.

The controller 16 can be configured or programmed to ensure that other environmental parameters can be user- or system-determined, including desirable levels of gases other than air, such as $CO_2$ or other noxious gases; airborne mould spore count; airborne dust levels; etc. The controller can in this case ensure that air is exhausted from and/or vented to the living space(s) when such levels become excessive.

As mentioned above, the system 10 can comprise one or more diverter valves 20. In the system 10 depicted in the drawings, the diverter valve 20 is shown located in the roof space RS. A diverter valve may also be provided for each of various living spaces/rooms in the building B. Each such diverter valve may receive air from the adjacent living space LS and/or from the roof space RS. Each such diverter valve may direct air to a single roof-mounted ventilator 12 (e.g. the directed air streams may be combined at one or more duct junctions). Alternatively, each such diverter valve may direct air to a respective roof-mounted ventilator 12.

In another variation, a diverter valve may be located in the subfloor space SF. In this case the diverter valve may be connected to a sub-floor fan whereby air may be drawn through the sub-floor or drawn out of or even pumped into the living space, such as from the subfloor space SF.

In any case, the diverter valve 20 shown in FIGS. 1 to 5 is configured for selectively receiving therethrough a flow of air from either or both of the living space LS and roof space RS, as controlled by the controller 16. In other words, the diverter valve 20 can be controlled to direct a flow of air from either or both of the living and roof spaces to the roof-mounted ventilator 12 to be exhausted to the atmosphere surrounding the building B, thereby facilitating control of the internal LS parameter(s).

The diverter valve 20 comprises two internally mounted and opposing valve flaps 32. Each valve flap 32 has a profile that enables it to cover respective openings into the diverter valve 20, in two respective orientations, as described below.

Each valve flap 32 is pivotally mounted and selectively movable in a housing 34 of the diverter valve 20 by a motor 36 mounted externally of the housing 34. An output shaft of the motor 36 is connected via linkages 38 to each of the valve flaps 32 to cause them to pivot within housing 34. Activation and operation of the motor 36 is controlled by the controller 16. The motor causes each valve flap 32 to pivot between a first position (FIGS. 5B to 5D) in which air is solely exhausted from the living space LS and directed to the roof-mounted ventilator 12, and a second position (FIG. 5F), in which air is solely exhausted from the roof space RS and directed to the roof-mounted ventilator 12. However, the valve flaps 32 can be controlled to pivot to various locations between the first and second positions (FIGS. 5A and 5E), whereby various air flow combinations from the living space LS and roof space RS result.

In this regard, the diverter valve housing 34 comprises a first inlet 40 which is connected to a duct 42 (FIGS. 1 to 4). Duct 42 in turn extends in the roof space RS and connects to a grille vent 44 located in ceiling C and opening onto the living space LS. The diverter valve housing 34 also comprises a second series of laterally located and opposing louvre-type inlets 46 and 48. The louvre-type inlets 46 and 48 are respectively opened and closed by corresponding valve flaps 32 (i.e. the facing profile of the flaps is shaped to cover over the inside area of inlets 46 and 48). The diverter valve housing 34 also comprises an outlet 50 connected via a short outlet duct 52 to an inlet of the roof-mounted ventilator 12.

Figure 5A:
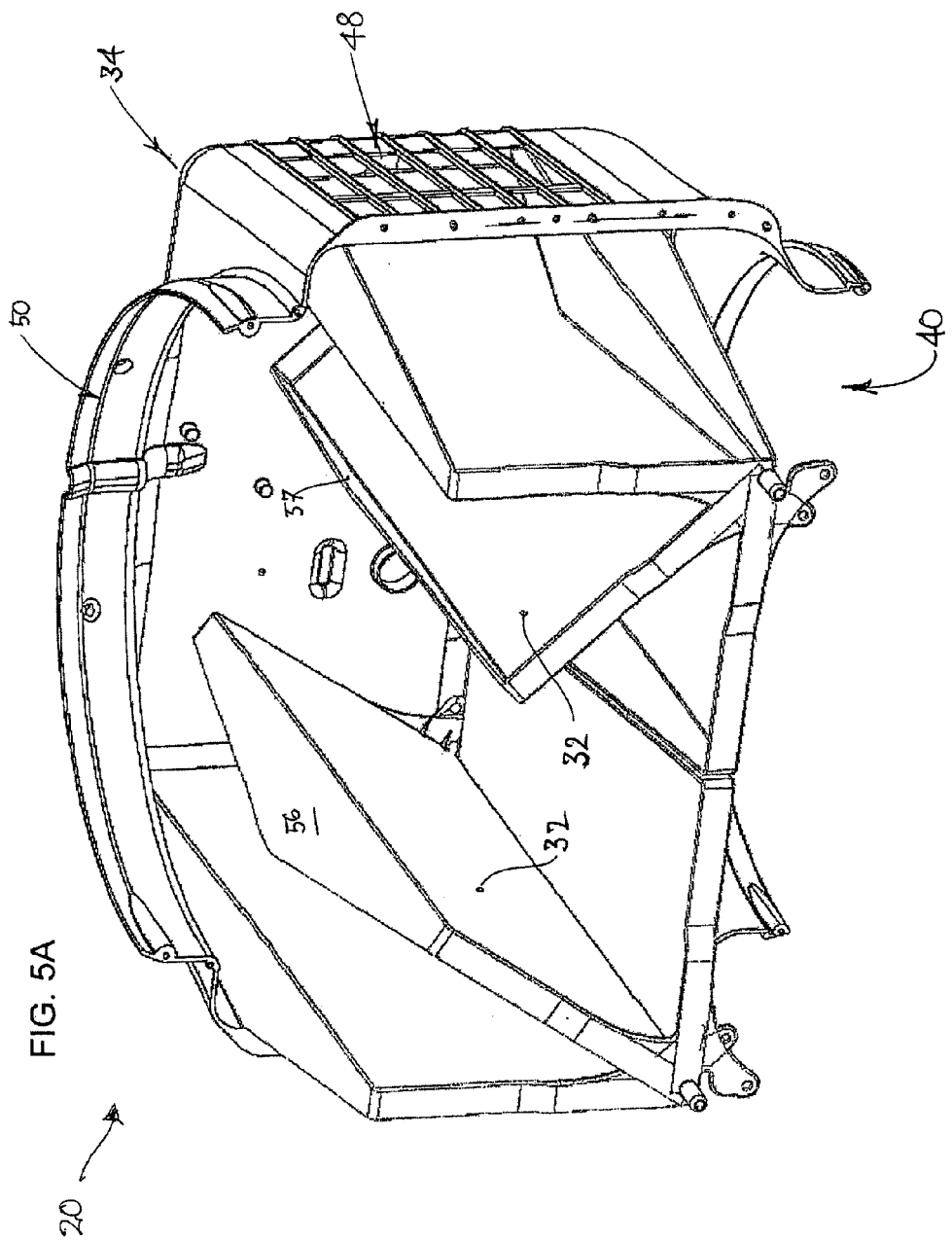
Figure 5B:
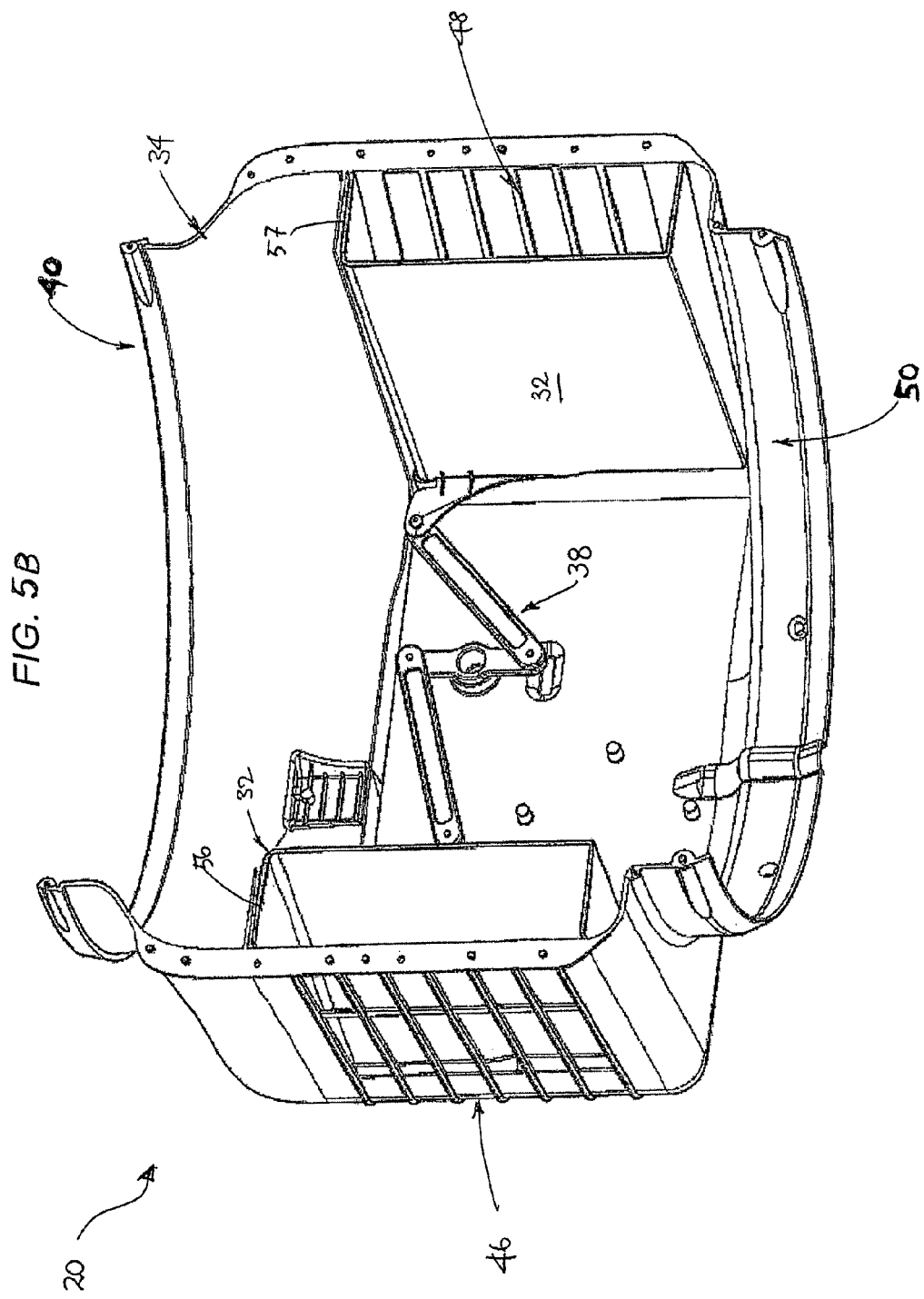
Figure 5C:
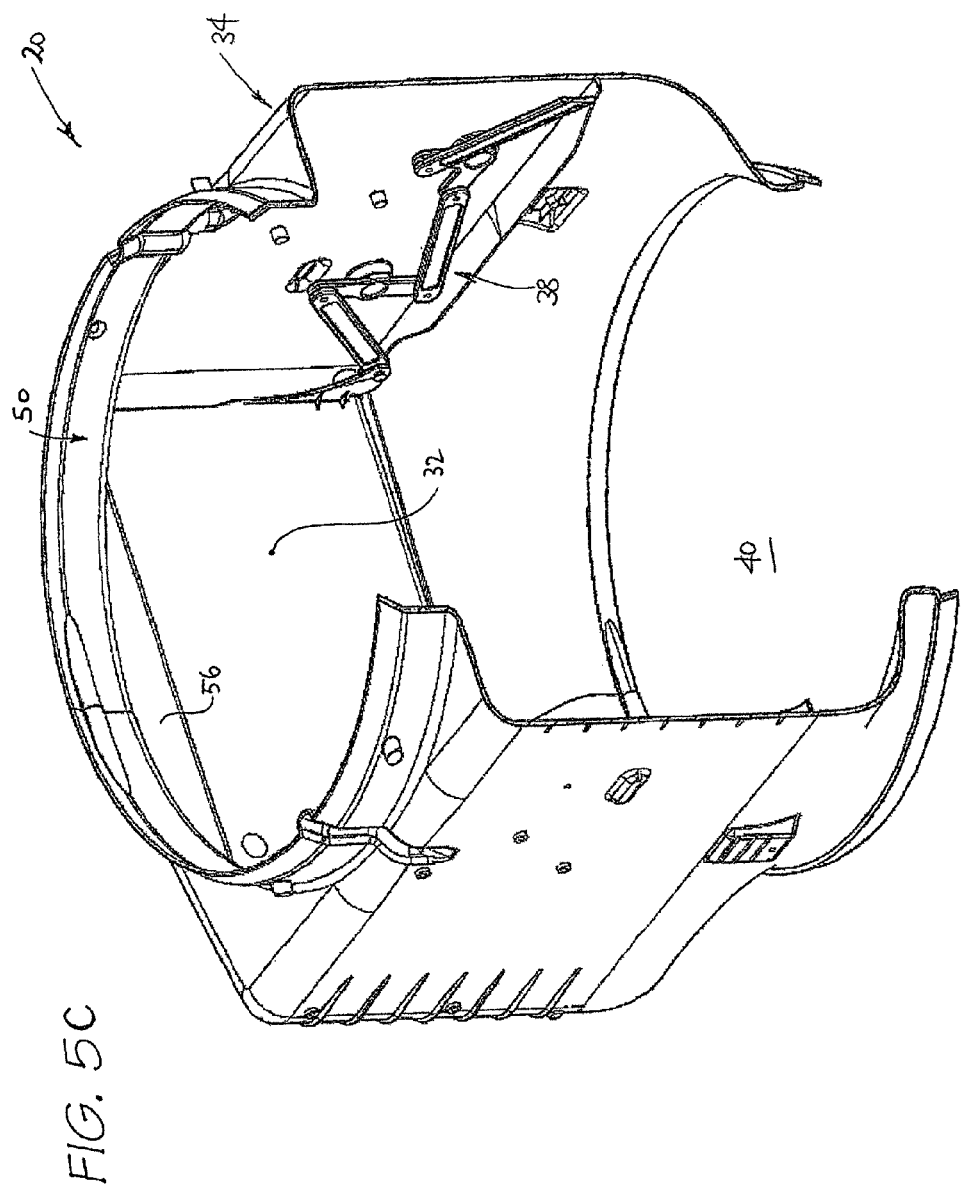
Figure 5E:
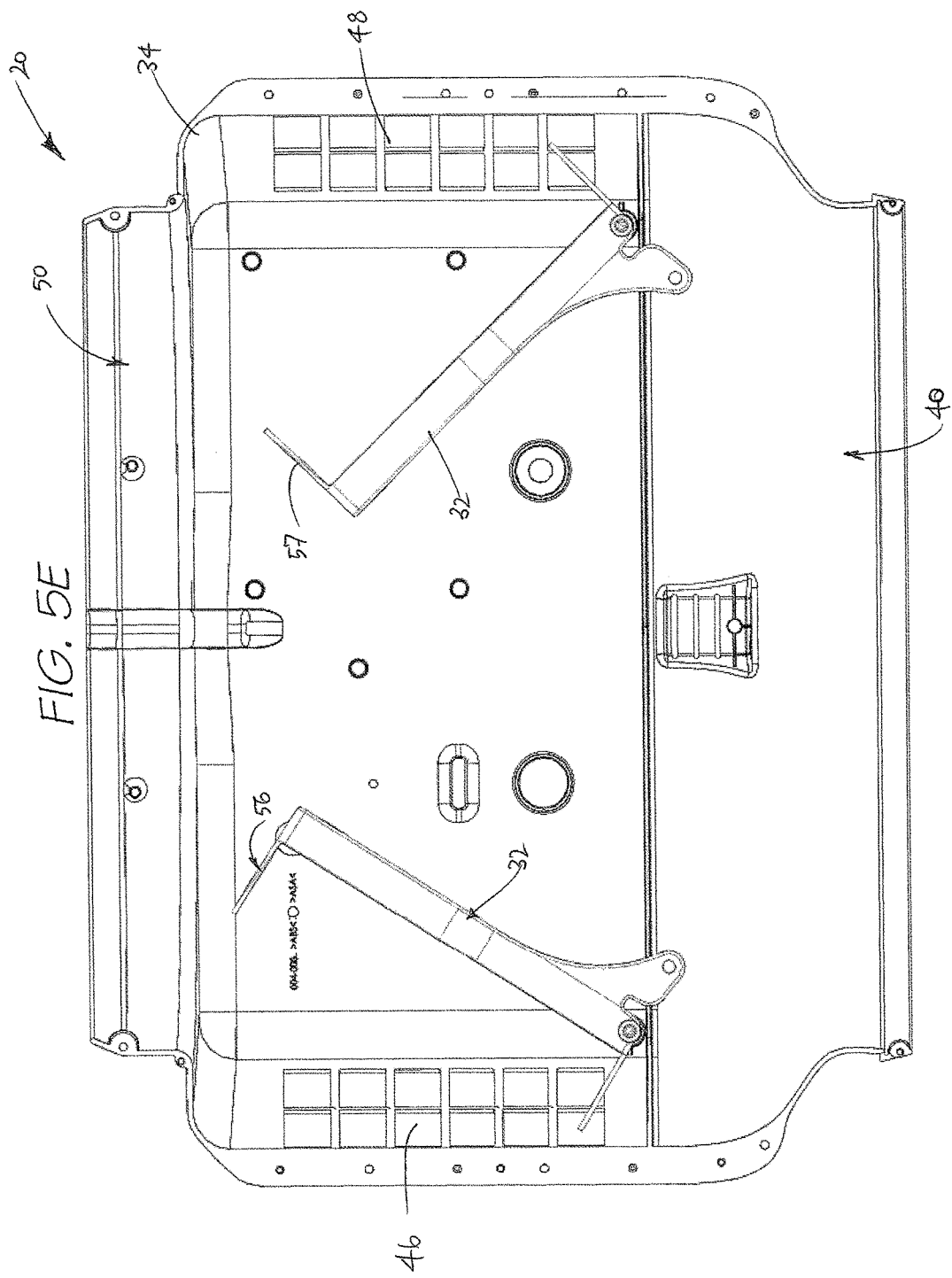
Figure 5G:
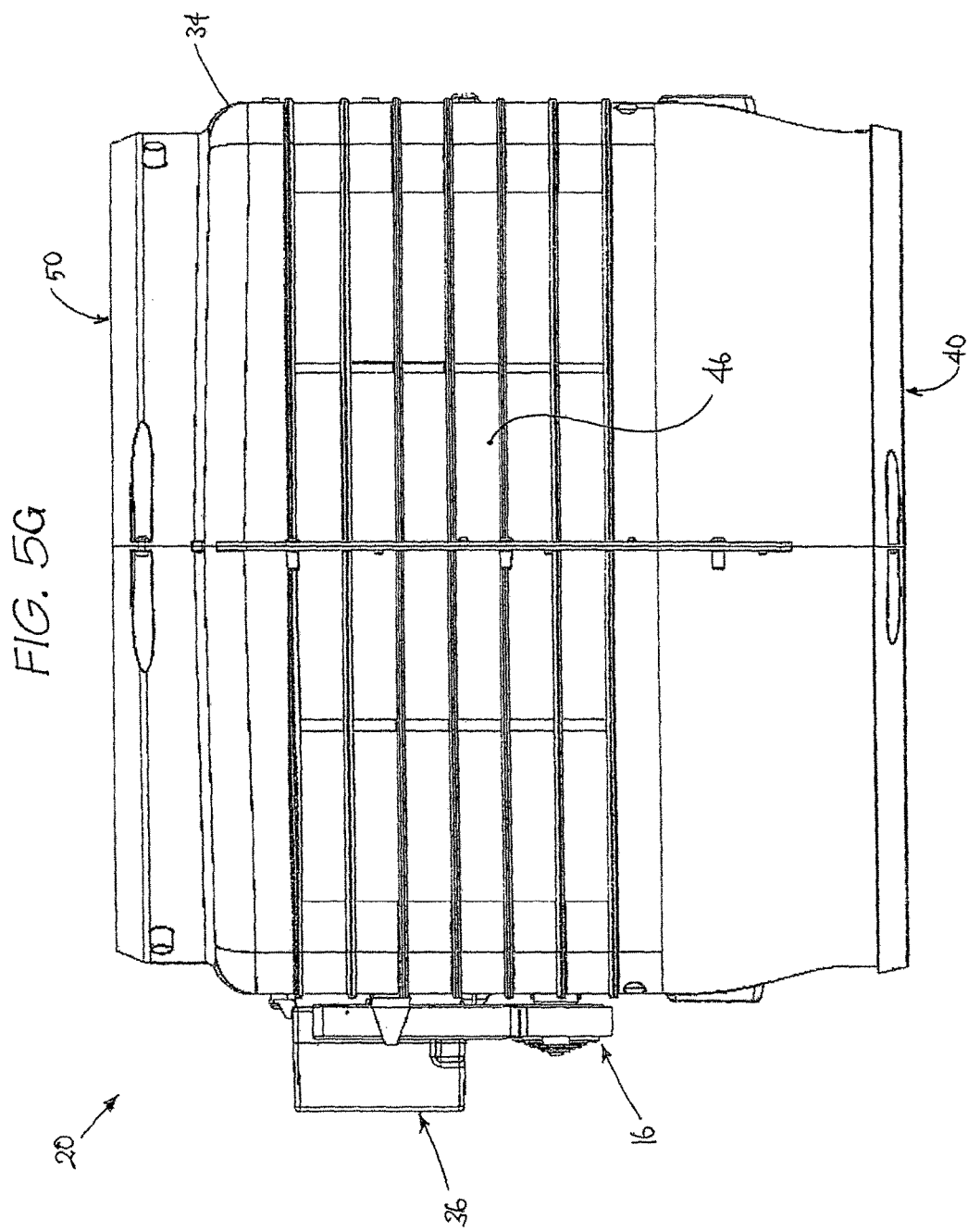

As described and as shown in FIGS. 5B to 5D, the diverter valve housing 34 is configured such that, when each valve flap 32 is in the first position (i.e. in which air is to be solely exhausted from the living space LS and directed to the roof-mounted ventilator 12), the valve flaps 32 close the louvre-type inlets 46, 48. Thus, air cannot pass from the roof space RS to the ventilator 12. As described and as shown in FIG. 5F, when each valve flap 32 is in the second position (i.e. in which air is to be solely exhausted from the roof space RS) the valve flaps 32 pivot down and close off at abutting faces 56, 57 the first inlet 40. Thus, air cannot pass from the living space LS to the ventilator 12. The faces 56, 57 also help close over the inlets 46 and 48 in the first position (see FIGS. 5B to 5D).

The system 10 can also comprise an internal roof space sensor 60 for measuring one or more environmental parameters of the roof space RS inside the building B. The roof space internal sensor may also be located integrally with the controller 16, whereby the measured parameter(s) of the roof space can be directly fed as signals into the controller. In addition, the control algorithm can take into account the measured parameter(s) of the roof space as part of the control procedure.

The system 10 can also comprise an internal sensor 62 for the sub-floor space SF of the building B. Again, the internal sensor 62 can feed as signals to the controller 16 measured parameter(s) of the sub-floor space, and the control algorithm can take into account the measured parameter(s) of the sub-floor space as part of the control procedure. The sub-floor space ventilator or fan 24 can be speed variable, and can be controlled by the controller 16 to exhaust air from the sub-floor space (i.e. to or from the atmosphere surrounding the building B). The controller 16 can both activate and control the speed of the sub-floor ventilator.

Where a diverter valve is employed in the sub-floor space, the ventilator/fan 24 may be employed to exhaust air from either the sub-floor space SF or from the living space LS via a floor-located vent FV.

In another variation, the sub-floor space ventilator/fan 24 may also be reconfigured to draw air into the sub-floor space.

The system 10 can also comprise an extra temperature sensor 70 attached to the underside of roof R. Sensor 70 may alternatively comprise a condensation sensor located on the underside of the roof. In either case, sensor 70 is configured to measure and thus enable determination of when the dew point is reached at the roof underside, and thus predict when condensation can/will occur. Such measurement can occur simultaneously with measurement of humidity in the roof space, such as via a hybrid sensor.

The external sensor 14 can measure and thus enable determination of whether atmospheric air is drier than roof space air, the latter being calculated using the feed from sensor 70. When it is determined by the controller that the atmospheric air is drier, the roof space air can be exhausted by the system 10, with replacement air entering the roof space via vents (e.g. in the eaves) and/or from the living space. The drier air entering the roof space can thereby reduce or stop condensation occurring and hence prevent damage to the building, such as by rot, mould, corrosion, etc. This control procedure may occur as part of or independently to control of the living space conditions (e.g. just to control condensation).

When the roof-mounted ventilator 12 is powered (e.g. taking the form of a fan or hybrid), the control of the roof-mounted ventilator may be in conjunction with (i.e. it may take into account) any additional wind powering of the ventilator. In this regard, the controller can adjust the power supplied to the ventilator to maintain a desired (e.g. predetermined) running speed of the ventilator 12. Such control has been modelled to provide significant electrical energy savings in the ventilation of a building.

The system 10 as described can thus provide for a variety of control sequences and outputs in the optimisation of parameter(s) within the enclosed space(s) of a building B.

Figure 6A:
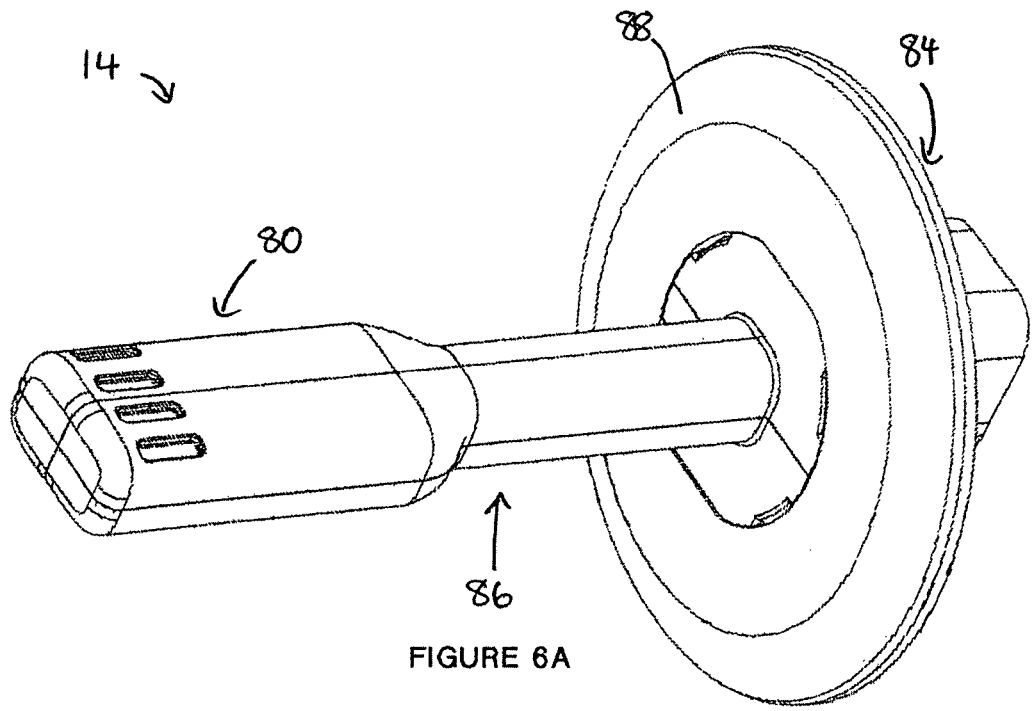
FIGS. 6A and 6B show perspective and sectional views, respectively, of one embodiment of an external sensor that forms a component of the system of FIGS. 1 to 4.
Figure 6B:
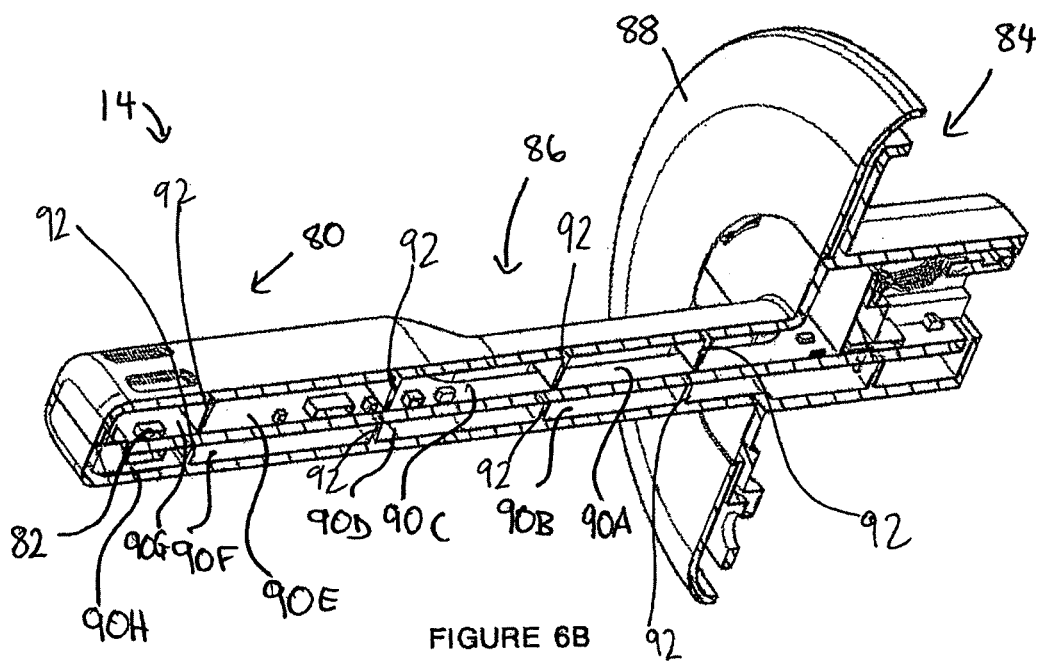

With reference to FIGS. 6A and 6B, more detailed views of the external sensor 14 are shown. The external sensor 14 can be configured to be spaced from the external surface XS (see FIG. 1) of the building B. In this regard, the remote section 80 of the external sensor 14, which contains the actual sensing component 82, is distanced from the mounting portion 84 of the external sensor 14 by an extending portion 86, thus isolating the sensing component 82 from the external surface XS of the building B. Distancing sensing component 82 from the external surface XS minimises the extent to which the measured external environmental parameter can be influenced by the sensing component's proximity to the external surface XS.

The external sensor 14 may, for example, measure external environmental parameters such as temperature and/or humidity. The material of the external surface XS of the building B may conduct, store and radiate heat. This storage and radiation of heat can influence the temperature measured by the sensing component 82, and may also cause condensation to form on the external surface XS, thereby influencing the humidity levels measured by the sensing component 82. Isolation of the sensing component 82 from the external surface XS can thus minimise the effect of the material properties of the external surface XS of the building.

The sensing component 82 can be further isolated from the external surface XS of the building by providing a shroud 88 adjacent to where the mounting portion 84 mounts to the external surface XS. The shroud 88 may be formed of an insulating material and, where the sensing component 82 measures temperature, assist in the prevention of both radiative and conductive heat affecting the measured temperature. Similarly, when the sensing component 82 measures humidity, the shroud 88 can provide a region on which the formation of condensation is prevented, reduced or minimised. If condensation does form on the external surface XS, the shroud 88 provides a region surrounding the extending portion 86 and remote section 80 thus minimising the likelihood of condensation dripping onto the remote section 80 and the sensing component 82 and affecting the measured humidity.

The sensing component 82 can be further isolated from the external surface XS of the building by compartmentalising the extending portion 86 and/or the remote section 80, as best shown in FIG. 6B. Both the extending portion 86 and remote section 80 are shown being substantially hollow, with a number of different compartments 90A-90H formed therein by a series of spaced walls 92. The compartments 90A-90H reduce the internal convective and conductive transfer of heat from the external surface XS to the sensing component 82, thereby reducing the conductive and convective heating effects of the external surface XS on the sensing component 82.

The extending portion 86 is also shown being narrower than the mounting portion 84 and the remote section 82, to further reduce conductive heat transfer and to reduce boundary layer build-up.

Similarly, the remote section 80 of the external sensor 14 is shown having a larger surface area than the extending portion 86. The increased surface area of remote section 82 is to ensure that ambient heat (i.e. the actual external air temperature) is transmitted to the sensing component 82. This, again, assists in providing the controller 16 with an accurate input signal, in the form of an accurate measurement of the external air temperature.

Whilst only the external sensor 14 has been described as being isolated from the surface to which it is mounted, other sensors in the system, such as internal sensor 18, internal roof space sensor 60, internal sub-floor space sensor 62, sensor 70, etc, may also be configured to be isolated from the surface to which they are mounted. Further, whilst external sensor 14 has been described in relation to the measurement of temperature and/or humidity, other external environmental parameters may also be measured by such a sensor.

As mentioned above, the system 10 can comprise additional (wind-driven, powered and/or hybrid) roof- and building-mounted ventilators. The additional ventilators can also be controllable by the controller to exhaust air from the building B. When, for example, an additional ventilator is powered, the controller may also be configured to control the speed of the additional ventilator, and may also take into account any associated wind power (such as with a hybrid).

The system 10 can be configured to operate, co-operate with and/or control all ventilators of the building B, with each being of different format to the roof-mounted ventilator 12. Such formats can include solely wind powered, solely electrically powered, sub-floor fans, wall-mounted exhaust and even intake fans, etc. For example, the system 10 and controller 16 can be configured to control and/or distribute and/or pass air to the roof-mounted ventilator 12, powered fan, wind-driven ventilator, sub-floor ventilator, and to open vents, windows, etc.

The system 10 can be programmed to co-operate with existing heating and cooling facilities of the building B. In this regard, the system may be configured to "talk" to and activate such facilities, where, for example, additional heating or cooling is required to achieve a specified environmental parameter.

As mentioned above, the various components of the system (controller, control panel, sensors, ventilator(s), diverter valve(s), etc) can be in wired and/or wireless connection with each other. Power for the various components of the system may comprise mains power, battery power, or power from renewable sources (optionally generated at the building), including solar, wind, micro-hydro, local geothermal, co- or tri-generated, etc.

EXAMPLES

Non-limiting examples will now be provided to illustrate how the system 10 can operate in use.

When interpreting these examples it should be understood that, on a hot day, usually the atmospheric air will be hotter and of higher humidity than in the living space LS. However, in the evening, at night-time and in the early morning, the atmospheric conditions generally change and can become suitable for use in affecting the environmental conditions of the living space.

In this regard, the system can make use of such atmospheric conditions to positively affect changes to the conditions of the living space (e.g. temperature, humidity, etc). For example, in the evening, at night-time and in the early morning, the outside conditions can tend to a lower temperature and humidity than the living space, and thus the system can use these conditions. Temperature and humidity in the living space may also be increased, relative to the atmosphere, by occupants themselves (e.g. body temperature) and by their activities such as washing, cooking, etc.

Example 1

Early in the evening, after a warm day, a user accessed the control panel 22. The internal sensor 18 measured and fed to the controller 16 a main living space temperature of 25° C. and this was displayed to the user. The user keyed in a desired main living space LS temperature of 21° C. The external sensor 14 measured and fed to the controller 16 a temperature outside the building B of 18° C. The roof space sensor 50 also detected a roof space temperature of 33° C. The control algorithm calculated a temperature differential and determined that the living space LS temperature would need to be brought down by 4° C. to achieve the user-specified temperature of 21° C. The control algorithm also determined that air should be exhausted from the building to the surrounding atmosphere.

The control algorithm of controller 16 responded by activating the motor of the roof-mounted hybrid ventilator 12 and initially increased its speed to a maximum. In addition, as wind speed external to the building increased, the controller 16 progressively reduced the power supplied to the motor of the hybrid ventilator 12, allowing more wind energy to drive the ventilator.

The control algorithm of controller 16 also activated the diverter valve 20, via motor 36, to cause the valve flaps 32 to be pivoted to the first position (FIGS. 5B to 5D), whereby relatively hotter (i.e. upper) living space air was directed to be exhausted from ventilator 12. The main living space LS temperature started to cool as air from the atmosphere was also drawn into the building However, the internal sensor 18 detected that the main living space LS temperature started to level out (i.e. was approaching an equilibrium) at a temperature above 21° C. The control algorithm of controller 16 now activated motor 36 to cause the valve flaps 32 to be pivoted to the second position (FIG. 5F), whereby roof space air was now directed to be exhausted from ventilator 12. This caused further cooling, and the controller caused the valve flaps 32 to now be pivoted to a third position intermediate the first and second positions (e.g. FIGS. 5A and 5E) to continue to exhaust air from both the living and roof spaces.

Exhausting air from each of the roof space RS and living space LS caused the temperature in the main living space to approach (and in some cases actually reach) the user-specified temperature of 21° C.

Example 2

In this example, the building B comprised a solely wind powered roof-mounted ventilator 12. The controller 16 was set on an auto-function to seek a main living space temperature of 22° C. After a still, windless night, the external sensor 14 detected an outside temperature of 15° C. The roof space sensor 50 detected a roof space temperature of 32° C. The internal sensor 18 detected a living space temperature of 25° C., thus this temperature would need to be brought down by 3° C. to achieve the system-specified temperature of 22° C.

The control algorithm of controller 16 initially responded by activating the motor 36 of diverter valve 20, to cause the valve flaps 32 to be pivoted to the first position, whereby living space air could pass to be exhausted from wind-driven ventilator 12. However, in the absence of wind, very little air was exhausted to atmosphere, and so the main living space LS temperature did not cool appreciably. The control algorithm of controller 16 now activated motor 36 to cause the valve flaps 32 to be pivoted to the second position, whereby the relatively hotter roof space air caused the wind-driven ventilator 12 to rotate, due to thermal currents, and thus warm air to pass out of the roof space.

The temperature in the main living space started to cool, but then approached equilibrium at a temperature above the target temperature of 22° C. By this time, a gentle morning breeze had started, and thus the control algorithm of controller 16 responded by moving the valve flaps 32 towards the first position, whereby living space air started to pass to be exhausted from wind-driven ventilator 12. The internal sensor 18 detected that the living space temperature now approached and reached the target temperature of 22° C., as relatively cooler air was drawn into the living space from the atmosphere, as well as from the sub-floor.

Example 3

In this example, the building B comprised a solely electrically powered roof-mounted ventilator 12. The controller 16 was pre-programmed to control the roof-mounted ventilator to achieve a living space temperature within the range of 20-22° C. After a hot day, the external sensor 14 measured and fed to controller 16 a temperature outside building B of 28° C. The roof space sensor 50 detected a roof space temperature of 40° C. The internal sensor 18 measured and fed to controller 16 a living space temperature of 33° C., thus the temperature could only be brought down by 5° C. and could not achieve the system-specified temperature of 22° C. However, the sub-floor space sensor 62 detected a sub-floor temperature of 22° C.

The control algorithm of controller 16 responded by activating the motor of the roof-mounted, variable speed, powered fan 12, initially to increase its speed to a maximum. In addition, the control algorithm of controller 16 responded by activating the motor 36 of diverter valve 20 to cause the valve flaps 32 to pivot to a mid-way position between the first and second positions. In this location air from both the living space LS and roof space RS was directed to be exhausted from fan 12. Floor vent FV was also opened to allow cooler air from the sub-floor space to flow into the living space LS. Ceiling vent CV was optionally also opened to allow warmer upper air from the living space LS to flow into the roof space RS. The temperature in the main living space cooled and started to approach the pre-programmed temperature range of 20-22° C. The user was able to supplement cooling by activating a separate air-conditioning unit, but it was also noted that less power needed to be consumed by that unit as a result of the cooling undertaken by system 10. As the evening cooled further, the controller was also progressively able to reduce the power fed to the fan 12, by progressively lowering the speed thereof.

Example 4

In this example, the building B comprised a hybrid roof-mounted ventilator 12. Towards the end of a hot and humid day, in which the building B had been closed up, a user accessing the internet specified at a dedicated web portal a main living space LS temperature of 22° C. and a relative humidity of 50% for the living space LS of building B. The signal was sent to a computer/receiver in building B in communication with the controller 16. An external hybrid sensor 14 was also measuring and feeding to the controller 16 an external temperature of 27° C. and a humidity of 70%. An internal hybrid sensor 18 was measuring and feeding to the controller 16 a main living space temperature of 32° C. and a humidity of 80%, and thus determined that the LS temperature would need to be brought down by 10° C., and the humidity by 30%, to reach the as-specified temperature and humidity. A roof space temperature sensor 60 detected a roof space temperature of 40° C. A sub-floor space temperature sensor detected a sub-floor temperature of 25° C. (i.e. hotter than the specified LS temperature of 22° C.).

The control algorithm of controller 16 responded by activating the motor of roof-mounted hybrid 12 to its maximum speed. In addition, the control algorithm of controller 16 responded by activating the motor 36 of diverter valve 20 to cause the valve flaps 32 to initially pivot to the second position to immediately exhaust the hot roof space air. In this location, the air from the roof space RS that was exhausted to atmosphere was replaced with air from the living space via ceiling vent CV, whilst air from the sub-floor space passed into the living space via the sub-floor vent. The temperature in the main living space started to cool and the humidity started to drop, each towards a lower equilibrium, but still above the as-specified temperature and humidity. The control algorithm of controller 16 now responded by activating the motor 36 of diverter valve 20 to cause the valve flaps 32 to pivot stepwise, to various intermediate positions, between the second and first positions, gradually increasing the amount of warm, moist air exhausted from the living space.

Once the living space temperature reached the sub-floor temperature of around 25° C., the control algorithm of controller 16 now responded by activating the motor of the sub-floor exhaust fan 24 to a maximum speed, causing air from this space to be exhausted to atmosphere.

As the roof space continued to cool, the valve flaps 32 were progressively moved to the first position, to exhaust more warm and moist air from the living space. Thus, the temperature and humidity in the living space dropped further, and each started to approach the user-specified temperature of 22° C. and humidity of 50%. As appropriate, the controller also progressively reduced the power fed to, and thus progressively lowered the speed of each of, the hybrid 12 and sub-floor fan 24. When the user arrived home, the temperature and humidity inside building B had each reached at least a desirable and comfortable level and could, as desired, be supplemented by further air conditioning.

Example 5

Having left home, a user checking the weather forecast on their phone noted that a hot and humid day was forecast in the region of the user's building B, with a maximum temperature of 35° C. and a maximum relative humidity of 100% being forecast. Via an application loaded on the user's smartphone, a living space LS temperature of 25° C. and a relative humidity of 60% were set. The signal was sent via a mobile phone network to a home-based receiver in communication with (e.g. built into) the controller 16.

At the time the signal was received, an internal hybrid sensor 18 was measuring and feeding to the controller 16 a main living space temperature of 30° C. and a humidity of 70%, and thus determined that the LS temperature would need to be brought down by 5° C., and the humidity by 20%, to achieve the user-specified temperature and humidity. At the same time, an external hybrid sensor 14 was measuring and feeding to the controller 16 an external temperature of 32° C. and a humidity of 65%. A roof space sensor 60 detected a roof space temperature of 35° C.

The control algorithm of controller 16 responded by activating a roof-mounted hybrid 12 to full speed. In addition, the control algorithm of controller 16 activated the motor 36 of diverter valve 20 to cause the valve flaps 32 to pivot to the second position to pump air from the roof space. After a time, the valve flaps 32 were moved towards the first position to also pump air from the living space. The temperature and humidity in the main living space started to approach the target air temperature of 25° C. and humidity of 60%. However, as the atmospheric temperature and humidity started to increase through the day, and the atmospheric wind speed increased, the control algorithm of controller 16 reduced the power supplied to the roof-mounted hybrid 12, and activated the motor 36 of diverter valve 20 to cause the valve flaps 32 to now pivot to the second position to exhaust roof space air, in an attempt to reduce the temperature rise therein throughout the day, with living space air also passing, via ceiling vent CV, into the roof space to be exhausted therefrom. However, as the living space temperature increased, the control algorithm also allowed replacement air into the living space LS from the sub-floor space, via a floor vent.

Towards the end of the day, as the daily temperature and humidity maximums started to drop, and the roof space started to cool, the valve flaps 32 were progressively moved closer to the first position, to continue to exhaust air from the main living space. Thus, the temperature and humidity in the living space could be further lowered, and each could start to approach (and in some cases actually reach) the user-specified temperature of 25° C. and humidity of 60%. As appropriate, the controller also progressively reduced the power fed to, and thus progressively lowered the speed of each of, the hybrid 12 and sub-floor fan. When the user arrived home, again the temperature and humidity inside building B had already reached desirable and comfortable levels.

Example 6

In a building comprising a busy family home, on a cool day in which the doors and windows of the building were closed, a user accessed the control panel 22 and activated a predetermined carbon dioxide level controller for the main living space LS. A special external sensor measured and fed to the controller 16 a level of carbon dioxide outside the building B. A special internal sensor measured and fed to the controller 16 a level of carbon dioxide inside the main living space. A dedicated part of the control algorithm calculated a carbon dioxide level differential and determined that the level of carbon dioxide in the main living space was approaching the predetermined maximum as set by the carbon dioxide level controller. Thus, the control algorithm determined that atmospheric air, with a much lower, as-measured, carbon dioxide level, should be drawn into the building from the surrounding atmosphere.

The control algorithm of controller 16 responded by reversing the polarity of the motor of roof-mounted fan 12, and activating it to full speed, so that it functioned as an air intake fan. In addition, the control algorithm of controller 16 activated the valve flaps 32 to pivot to the first position. Thus, atmospheric air was pumped into the living space LS. The control algorithm also opened floor vent FV and sub-floor fan 24 was activated, to pump a corresponding amount of air out of the living space LS. The level of carbon dioxide in the main living space, as measured by the special internal sensor, dropped well below the predetermined maximum of the carbon dioxide level controller.

Example 7

In this example, the building B and system 10 comprised a temperature sensor 70 attached to the underside of roof R. The controller 16 was programmed to attempt to maintain a relative humidity level immediately adjacent to the underside of the roof R of less than 40%. During a hot and humid day, the sensor 70 measured a temperature adjacent to the underside of the roof which, in conjunction with the temperature and humidity measured by roof space sensor 60, was calculated by the controller 16 to indicate that the dew point had been reached at the roof underside, and thus the system predicted that condensation would be occurring.

The external sensor 14 measured that the atmospheric air was drier (of lesser relative humidity) than the roof space air, and thus the system 10 fed, via diverter valve 20, the roof space air to the ventilator 12 to be exhausted to atmosphere. At the same time vents in the eaves were opened and dry replacement atmospheric air entered the roof space. When the system 10 calculated that the living space air was also drier than the roof space air, air was also allowed to enter the roof space via ceiling vent CV. This part of the control procedure was observed to help prevent condensation occurring at the roof space underside. The system 10 was programmed so that condensation prevention occurred independently of the control of living space conditions. In other words, the system 10 was able to independently control roof space environmental conditions.

Example 8

In this example, the building B comprised a hybrid (i.e. wind and/or motor driven) roof-mounted ventilator 12. In this example, the system 10 comprised an external sensor 14 to measure the external air temperature, an internal sensor 18 to measure the temperature of the main living space LS of the building B and a roof space sensor 50 to measure the temperature in the roof space. The controller 16 was pre-programmed with a control algorithm to calculate when a positive or negative temperature differential existed between the external temperature (i.e. external to the building) and the internal temperature of a main living space LS of the building. The control algorithm also determined when the internal temperature of the main living space LS was within a pre-programmed temperature range. The controller 16 had also been pre-programmed to activate the motor of the hybrid ventilator 12 when the roof space temperature was measured to be 45° C. and when the internal temperature of the main living space was a) within the pre-programmed temperature range, or b) the external temperature was higher than the internal temperature and thus no beneficial cooling could be achieved by drawing in external air. In this example, a temperature range of 20-21° C. had been pre-programmed, during manufacture of the controller, as the target temperature range for the living space LS of the building B, although the user could override the factory settings if a higher or lower temperature or range was preferred.

The system 10 also comprised a diverter valve 20 having valve flaps 32 which could be repositioned by motor 36 to alter the location from which air was being exhausted (i.e. air could be exhausted from the roof space RS or the living space LS of the building B). The controller 16 was able to activate motor 36 to change the position of the valve flaps, and could also activate and de-activate the motor of hybrid ventilator 12.

On one day, the internal temperature of the living space LS was measured by the internal sensor 18 to be 26° C. The external temperature was measured by the external sensor to be 23° C. In such a case (i.e. when the measured external temperature was lower than the internal temperature), the control algorithm of the controller 16 activated the diverter valve 20, via motor 36, to cause the valve flaps 32 to be pivoted to the first position (FIGS. 5B to 5D), whereby relatively hotter living space air was directed to be exhausted from ventilator 12. The controller 16 also activated the motor of the hybrid roof-mounted ventilator 12, thereby drawing the hotter air out of the living space LS. It was observed that over time this lowered the temperature of the living space LS to 24° C., as cooler outside air was drawn into the space through windows and other openings.

As the day went on, the external temperature began to increase. Once the external temperature was measured to be 25° C. (i.e. higher than the temperature of the internal living space), the control algorithm determined that no further reduction of the living space temperature would be possible. The controller 16 then activated the diverter valve 20, via motor 36, to cause the valve flaps 32 to be pivoted to the second position (FIG. 5F), whereby the roof space air was now directed to be exhausted from ventilator 12. The roof space temperature was measured to be 35° C., so controller 16 also de-activated the motor of the hybrid roof-mounted ventilator 12, with the hot air in the roof being removed from the roof space RS using the natural ventilation capabilities of the ventilator 12.

During the day, the external temperature continued to increase, thereby increasing both the roof space temperature and the living space temperature. At one point during the day, the external temperature was measured to be 32° C., the internal temperature was measured to be 25° C. and the roof space temperature was measured to be 45° C. As the external temperature was higher than the internal temperature, and the roof space temperature was 45° C., the controller 16 activated the ventilator motor to enable a higher extraction rate of air from the roof space. It was observed to prevent the roof space from building up a substantial amount of heat.

As the external temperature continued to increase, to a maximum of 38° C., and the internal temperature (26° C.) remained lower than the external temperature and the roof space temperature remained above 45° C., the ventilator 12 continued to work in a powered mode.

Later that day, the external temperature began to drop. The roof space temperature also began to drop and, once the roof space temperature was below 45° C., the controller 16 deactivated the ventilator motor, with the hot air in the roof again being removed from the roof space RS using the natural ventilation capabilities of the ventilator 12. When the external sensor 14 measured an external temperature of 25° C. (i.e. lower than the internal temperature of 26° C.), the control algorithm activated the diverter valve 20, via motor 36, to cause the valve flaps 32 to be pivoted back to the first position (FIGS. 5B to 5D), to exhaust the air from the hotter living space and draw the cooler external air into the living space via windows and other openings. The controller also activated the motor of the ventilator 12 to ensure adequate extraction of air from the living space.

Later that evening, the external temperature had dropped to 18° C. and the internal living space temperature had been cooled to 21° C., whilst the roof space temperature was still 35° C. As the internal temperature had reached its pre-programmed range of 20-21° C., the controller 16 activated the diverter valve 20, via motor 36, to cause the valve flaps 32 to be pivoted back to the second position (FIG. 5F), to exhaust hot air from the roof space and deactivate the motor of the ventilator to reduce energy consumption. If the internal living space temperature increased above 21° C., the controller would again cause the valve flaps to return to the first position and reactivate the ventilator motor, and vice versa.

A few months later, the internal temperature was consistently lower than the pre-programmed range of 20-21° C. The external temperature was also lower than both the internal temperature and the pre-programmed temperature range, so the valve flaps 32 remained in the second position for exhausting air from the roof space. However, a user of the system 10 noticed that the air in the internal space was beginning to become odorous and stale. The user then overrode the system, via control panel 22, to exhaust air from the internal space and draw external air into the internal space via windows and/or other openings (i.e. the control algorithm activated the diverter valve 20, via motor 36, to cause the valve flaps 32 to be pivoted back to the first position (FIGS. 5B to 5D) and the motor of the ventilator 12 was activated). The user selected this mode to continue for 2 hours, before the controller reverted the system to the previous operating conditions (i.e. the flaps returned to the second position and the ventilator motor was deactivated, to exhaust air from the roof space).

The next day, the control algorithm determined that both the internal and external temperatures, respectively 15° C. and 18° C., were below the pre-programmed range of 20-21° C. The control algorithm also determined that the external temperature was higher than the internal temperature (i.e. the external temperature was closer to the pre-programmed range than the internal temperature was). The controller 16 then activated the motor of the ventilator 12 and caused the valve flaps 32, via motor 36, of diverter valve 20 to be pivoted back to the first position (FIGS. 5B to 5D) so that the warmer outside air was drawn into the internal living space. It was observed that this increased the temperature of the internal living space. As the day went on, the external temperature dropped to 12° C., which was below the internal temperature of 16° C. The control algorithm then caused the controller to revert the system to the previous operating conditions, with the flaps returning to the second position and the ventilator motor was deactivating, to exhaust air from the roof space naturally.

A few months later, the control algorithm determined that the internal temperature (18° C.) was lower than the pre-programmed range of 21-22° C., and that the external temperature (23° C.) was higher than the internal temperature. The controller 16 then activated the motor of the ventilator 12 and caused the valve flaps 32, via motor 36, of diverter valve 20 to be pivoted back to the first position (FIGS. 5B to 5D) so that the warmer outside air was drawn into the internal living space. It was observed that this increased the temperature of the internal living space. Again, when the internal temperature reached the pre-programmed temperature range of 21-22° C., the controller 16 deactivated the motor of the ventilator 12 and returned the flaps 32 of diverter valve 20 to their second position, to exhaust air from the roof space.

It will be understood to persons skilled in the art that many other modifications may be made without departing from the spirit and scope of the system as disclosed herein. For example, where a "roof-mounted" ventilator is referred to, the ventilator may equally be a ventilator externally mounted at an upper region of the enclosed space. Additionally, where reference is made to first and second enclosed regions within the enclosed space, the first and second enclosed regions may be adjacent rooms. In this regard, the first enclosed region may be an office or workspace, and the second enclosed region may be a generally hotter industrial-type space which contains heat emitting equipment, etc. Alternatively, and as described herein, the second enclosed region may be located above a ceiling of the first enclosed region.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the system and device.

The invention claimed is:

1. A system for optimising an environmental parameter of an enclosed space comprising first and second substantially enclosed regions, the system comprising:
 a ventilator configured to be externally mounted at an upper region of the enclosed space;
 a diverter valve having one or more valve members, each selectively movable in a diverter valve housing to enable the diverter valve to selectively receive therethrough a flow of air from each of the first and second enclosed regions and to direct the flow of air to the ventilator to be exhausted therefrom such that,
 when the one or more valve members are in a first position, the flow of air is received only from the first enclosed region,
 when the one or more valve members are in a second position, the flow of air is received only from the second enclosed region, and
 when the one or more valve members are in a third position between the first and second positions, the flow of air is received from both enclosed regions;
 an external sensor configured to measure an environmental parameter external to the enclosed space;
 a first internal sensor configured to measure an environmental parameter internal to the first enclosed region; and
 a controller, having an electronic processor and memory, configured to enable the environmental parameter of the first enclosed region to be specified,
 wherein the controller is further configured to receive the measured environmental parameters from the external sensor and from the first internal sensor, to compare the specified internal environmental parameter of the first enclosed region, the measured internal environmental parameter of the first enclosed region, and the measured external environmental parameter, and to control the one or more valve members of the diverter valve to selectively place the one or more valve members in any of the first, second and third positions and thereby determine whether the diverter valve by itself directs air from only the first enclosed region, only the second enclosed region or both of the first and second enclosed regions to the ventilator to be exhausted therefrom, such that the measured internal environmental parameters of the first enclosed region approaches the specified internal environmental parameters of the first enclosed region.

2. The system as claimed in claim 1 wherein the external sensor is mounted to an external surface of the enclosed space, the external sensor configured to be sufficiently spaced from the external surface such that influence on the measured external environmental parameter by the external surface is minimised.

3. The system as claimed in claim 1 further comprising a second internal sensor configured to measure an environmental parameter internal to the second enclosed region.

4. The system as claimed in claim 3 wherein the controller is further configured to receive the measured environmental parameter from the second internal sensor, determine when a differential exists between the specified internal first enclosed region, measured first enclosed region, measured second enclosed region and/or measured external environmental parameters and, responsive to a determined differential, control the one or more valve members to cause the diverter valve to receive and directs air from the first or second region to be exhausted via the ventilator.

5. The system as claimed in claim 3 wherein the controller is further configured to enable the environmental parameter of the second enclosed region to be specified.

6. The system as claimed in claim 5 wherein the controller is further configured to receive the measured environmental parameter from the second internal sensor, determine when a differential exists between the specified internal first enclosed region, measured first enclosed region, specified internal second enclosed region, measured second enclosed region and/or measured external environmental parameters and, responsive to a determined differential, whether the diverter valve directs air from the first or second enclosed region to be exhausted via the ventilator.

7. The system as claimed in claim 1 wherein the second enclosed region is located above a ceiling to the first enclosed region.

8. The system as claimed in claim 1 wherein the ventilator is a roof-mounted ventilator, mounted to a roof of the enclosed space.

9. The system as claimed in claim 1 wherein, when the enclosed space is defined by a building, the first enclosed region comprises a living space and the second enclosed region comprises a roof space located above a ceiling of the living space and under and adjacent to a roof of the building.

10. The system as claimed in claim 1 wherein the enclosed space further comprises a third substantially enclosed region located under the first enclosed region.

11. The system as claimed in claim 10 wherein, when the enclosed space is defined by a building, the first enclosed region comprises a living space, the second enclosed region comprises a roof space located above a ceiling of the living space and under and adjacent to the roof, and the third enclosed region comprises a sub-floor space.

12. The system as claimed in claim 11 further comprising a subfloor ventilator configured to be mounted to the sub-floor space, the sub-floor ventilator also being controllable by the controller.

13. The system as claimed in claim 12 wherein, when the subfloor ventilator is powered, the controller is further configured to control the speed of the subfloor ventilator.

14. The system as claimed in claim 1 wherein the ventilator is wind-driven and/or powered.

15. The system as claimed in claim 14 wherein, when the ventilator is powered, the controller is further configured to control the speed of the ventilator.

16. The system as claimed in claim 14 wherein, when the ventilator is a hybrid of wind-driven and powered, the controller is further configured to control the speed of a motor of the ventilator in response to additional wind driving of the ventilator.

17. The system as claimed in claim 1 wherein the ventilator is configured to draw air into the enclosed space from beyond the enclosed space.

18. The system as claimed in claim 1 further comprising an additional ventilator, wherein the controller is further configured to control the additional ventilator to exhaust air from and/or draw air into the enclosed space.

19. The system as claimed in claim 18 wherein the additional ventilator is wind-driven and/or powered.

20. The system as claimed in claim 19 wherein, when the additional ventilator is powered, the controller is further configured to control the speed of the additional ventilator.

21. The system as claimed in claim 19 wherein, when the additional ventilator is a hybrid of wind-driven and powered, the controller is also further configured to control the speed of a motor of the additional ventilator in conjunction with the wind.

* * * * *